United States Patent [19]

Sugaya et al.

[11] Patent Number: 5,094,129
[45] Date of Patent: Mar. 10, 1992

[54] HYDRAULIC CONTROL APPARATUS FOR VEHICLE CONTINUOUSLY VARIABLE TRANSMISSION, HAVING MEANS FOR LIMITING INCREASE IN INPUT SHAFT SPEED AFTER THE SPEED RISES TO PREDETERMINED LEVEL WITH VEHICLE SPEED

[75] Inventors: Masami Sugaya; Yoshinobu Soga, both of Susono, Japan

[73] Assignee: Toyota Jidosha Kabushiki Kaisha, Aichi, Japan

[21] Appl. No.: 628,326

[22] Filed: Dec. 17, 1990

[30] Foreign Application Priority Data

Dec. 25, 1989 [JP] Japan ................................. 1-335972

[51] Int. Cl.$^5$ ...................... F16H 11/02; B60K 41/16
[52] U.S. Cl. ........................................ 74/868; 74/867; 474/28; 474/11
[58] Field of Search ................... 74/867, 868; 474/28, 474/11

[56] References Cited

U.S. PATENT DOCUMENTS

| | | | |
|---|---|---|---|
| 4,618,123 | 10/1986 | Bilharz et al. | 192/0.076 |
| 4,663,991 | 5/1987 | Nakamura et al. | 74/868 |
| 4,781,655 | 11/1988 | Tezuka | 74/868 |
| 4,797,327 | 5/1988 | Itoh et al. | 74/867 |
| 4,942,786 | 7/1990 | Dittrich | 474/28 X |

FOREIGN PATENT DOCUMENTS 61-48658 3/1986 Japan .

*Primary Examiner*—Leslie A. Braun
*Assistant Examiner*—Daniel Wittels
*Attorney, Agent, or Firm*—Oliff & Berridge

[57] ABSTRACT

A hydraulic control control apparatus for controlling a speed ratio of a vehicle continuously variable transmission, which includes a device for producing a first pressure varying with the input shaft speed of the transmission, a device for producing a second pressure varying with the currently required output of the vehicle engine, a device for producing a third pressure varying with the vehicle speed, such that a rate of increase in the third pressure is limited after the vehicle speed pressure reaches a predetermined upper limit which varies with the second pressure, and a shift control valve device including a valve spool operated to control the hydraulic actuator for changing the speed ratio so as to shiftdown the transmission, in relation to an increase in the second pressure and an increase in the vehicle speed pressure, and changing the speed ratio so as to shift-up the transmission, in relation to an increase in the first speed pressure.

13 Claims, 16 Drawing Sheets

HYDRAULIC CONTROL APPARATUS FOR VEHICLE CONTINUOUSLY VARIABLE TRANSMISSION, HAVING MEANS FOR LIMITING INCREASE IN INPUT SHAFT SPEED AFTER THE SPEED RISES TO PREDETERMINED LEVEL WITH VEHICLE SPEED

BACKGROUND OF THE INVENTION

1. Field of the Invention

The present invention relates to a hydraulic control apparatus for controlling the speed ratio of a continuously variable transmission for a motor vehicle.

2. Discussion of the Prior Art

An example of a hydraulic control apparatus for controlling the speed ratio of a vehicle continuously variable transmission is disclosed in laid-open Publication No. 61-48658 of unexamined Japanese Patent Application. Here, the speed ratio "r" is defined as a ratio Nin/Nout, where Nin represents the speed of the input shaft of the transmission, and Nout represents the speed Nout of the output shaft. The hydraulic control apparatus disclosed in this publication uses a shift control valve which includes: a valve spool adapted to receive an input shaft speed pressure corresponding to the speed of an input shaft of the continuously variable transmission so that the spool is biased by this pressure in the shift-up direction; an actuator plunger adapted to receive via a spring a thrust corresponding to the amount of operation of an accelerator pedal of the vehicle so that the spool is biased by this thrust in the shift-down direction; an adjusting spring; and a first and a second plunger which are received in the spool and the actuator plunger, respectively, and which are adapted to compress the adjusting spring interposed therebetween when a line pressure of the hydraulic circuit of the apparatus is lowered. When the line pressure is lowered as the speed ratio is reduced from the maximum value, the speed ratio is controlled so that the input shaft speed pressure increases with an increase in the compressive force of the adjusting spring, so as to maintain equilibrium of forces acting on the valve spool in the opposite directions. Consequently, the rate of increase in the input shaft speed of the transmission increases with a rise in the running speed of the vehicle. This arrangement adapted to increase the input shaft speed at a rate sufficiently higher than the rate of an initial rise in the vehicle speed not only provides a high degree of initial acceleration of the vehicle, but also assures reduced operating noise of the engine with the engine speed limited to a comparatively low level when the speed ratio of the transmission is near the maximum value.

In the thus constructed known hydraulic control apparatus for a vehicle continuously variable transmission, the input shaft speed of the transmission is changed based on the line pressure which varies as a function of the speed ratio, as the speed ratio is changed from the maximum value to the minimum value. In this arrangement, the input shaft speed is changed relative to the vehicle running speed, irrespective of a change in the amount of opening of the throttle valve (amount of operation of the accelerator pedal), over the entire range of the speed ratio of the transmission between the maximum and minimum values. Therefore, there is a tendency that the input shaft speed considerably increases when the vehicle speed has been raised to a comparatively high level. Thus, the known hydraulic control apparatus does not permit sufficiently high fuel economy of the vehicle.

SUMMARY OF THE INVENTION

It is therefore an object of the present invention to provide a hydraulic control apparatus for a continuously variable transmission for a motor vehicle, which is capable of controlling the speed ratio of the transmission such that the input shaft speed of the transmission increases with the vehicle speed until the vehicle speed rises to a predetermined upper limit which is determined to increase with an increase in the currently required output of the engine represented by a suitable parameter such as the amount of opening of the throttle valve of the vehicle engine, and such that the rate of increase in the input shaft speed relative to the vehicle speed is limited after the vehicle speed exceeds the predetermined upper limit.

The above object may be achieved according to the principle of the present invention, which provides a hydraulic control apparatus for controlling a speed ratio of a continuously variable transmission for a motor vehicle with an engine, the transmission having an input and an output shaft and a hydraulic actuator, the apparatus comprising: (1) means for producing an input shaft speed pressure or first pressure varying with a speed of the input shaft; (2) means for producing an engine output pressure or second pressure; and varying with a currently required output of the engine; (3) means for producing a vehicle speed pressure or third pressure varying with a running speed of the vehicle, such that a rate of increase in the vehicle speed pressure is limited after the vehicle speed pressure reaches a predetermined upper limit which varies with the engine output pressure; and (4) a shift control valve device including a valve spool which receives the input shaft speed pressure, the engine output pressure and the vehicle speed pressure to control the speed ratio. The shift control valve device operates to control the hydraulic actuator for changing the speed ratio so as to shift-down the transmission, in relation to an increase in the currently required output of the engine and an increase in the running speed of the vehicle, and changing the speed ratio so as to shift-up the transmission, in relation to an increase in the input shaft speed.

In the hydraulic control apparatus of the present invention constructed as described above, the valve spool of the shift control device is adapted to receive the input shaft speed pressure, engine output pressure and vehicle speed pressure to control the speed ratio of the continuously variable transmission. The shift control valve device operates to control the hydraulic actuator such that the speed ratio is changed so as to shift-down the transmission, in relation to increases in the currently required engine output and the vehicle running speed, and to shift-up the transmission, in relation to an increase in the input shaft speed of the transmission. Further, the vehicle speed pressure increases with an increase in the vehicle speed, but the rate of increase in the vehicle speed pressure is limited after the vehicle speed pressure or vehicle speed reaches a predetermined upper limit. This upper limit increases with an increase in the engine output pressure. Accordingly, where the currently required output of the engine represented by the opening of the throttle valve, for example, is constant, the input shaft speed of the transmission increases with an increase in the vehicle speed as the vehicle speed pressure increases until the vehicle speed pressure reaches the predetermined upper limit corresponding to the engine output pressure. After the vehicle speed pressure rises to the upper limit, the rate of increase in the vehicle speed pressure is limited, for example, such that the vehicle speed pressure is kept constant at the predetermined upper limit. Therefore, the rate of increase in the input shaft speed relative to the vehicle speed is accordingly limited after the vehicle speed pressure reaches the predetermined upper limit. Thus, the hydaulic actuator is controlled by the shift control valve device to control the speed ratio of the continuously variable transmission.

According to the instant hydraulic control apparatus, when the speed ratio of the transmission decreases from the maximum value toward the minimum value, the input shaft speed of the transmission increases with the vehicle speed when the speed ratio is relatively near the maximum value. After the vehicle speed reaches a predetermined level corresponding to the engine output pressure (currently required output of the engine), the increase in the input shaft speed is limited. Namely, while the vehicle speed is relatively low, the input shaft speed of the transmission increases with the vehicle speed, thereby enabling the vehicle to start or accelerate with excellent drivability, without a problem of operating noise of the engine during a low-speed running of the vehicle. Further, after the vehicle speed reaches the predetermined level corresponding to the engine output pressure (corresponding to the upper limit of the vehicle speed pressure), the rate of increase in the input shaft speed is limited. For instance, the input shaft speed is kept at the predetermined level while the vehicle speed rises from the predetermined level. Accordingly, the present hydraulic control apparatus assures a relatively high degree of fuel economy of the vehicle at a comparatively high running speed.

BRIEF DESCRIPTION OF THE DRAWINGS

The above objects, features and advantages of the present invention will be better understood by reading the following detailed description of presently preferred embodiments of the present invention, when considered in connection with the accompanying drawings, in which.

DESCRIPTION OF THE PREFERRED EMBODIMENTS

Figure 1:
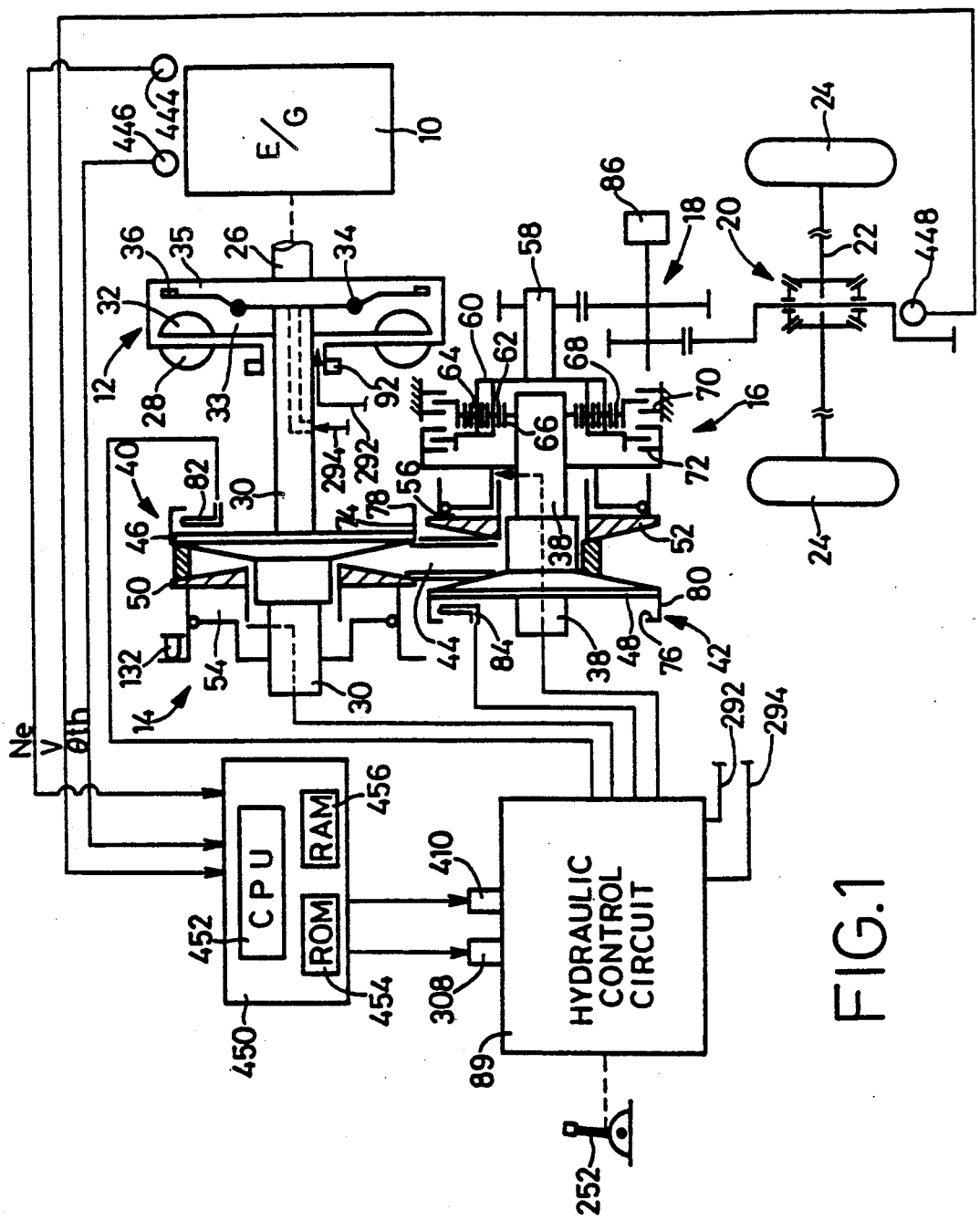
FIG. 1 is a schematic view of a vehicle power transmitting system including a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 which is connected to the engine 10 through a crankshaft 26 and equipped with a lock-up clutch 36; a continuously variable transmission (hereinafter abbreviated as "CVT") 14 connected to the fluid coupling 12; a reversing gear mechanism in the form of a reversing device 16 connected to the output side of the CVT 14, for selecting a forward or a reverse running of the vehicle; an intermediate gear device 18 connected to the reversing device 16; a differential gear device 20 connected to the intermediate gear device 18; and a drive axle 22 connected to the differential gear device 20 and the drive wheels 24, 24.

The fluid coupling 12 includes: a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 292 (which will be described), and a releasing chamber 35 communicating with a releasing line 324 (which will be described). The fluid coupling 12, which is always filled with the working fluid, is operated to effect engagement of the lock-up clutch 36 for direct connection of the crankshaft 26 to the input shaft 30, when a predetermined condition is satisfied, for example, when a running speed V of the vehicle exceeds a predetermined upper limit, or when a difference between the speeds of the pump and turbine impellers 28, 32 becomes smaller than a predetermined lower limit. In this case, the fluid is fed into the engaging chamber 33 while the fluid is discharged from releasing chamber 35. When the vehicle speed V falls below a predetermined lower limit or when the speed difference indicated above exceeds a predetermined upper limit, on the other hand, the lock-up clutch 36 is released or disengaged such that the fluid is fed into the releasing chamber 35 and discharged from the engaging chamber 33.

The CVT 14 has a pair of variable-diameter pulleys 40, 42 having a same diameter. The pulleys 40, 42 are provided on the input shaft 30 and an output shaft 38, respectively, and are connected by a transmission belt 44. The two pulleys 40, 42 have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, so that the effective widths of V grooves of the pulleys 40, 42 or the effective diameters engaging the belt 44 are changed to change a speed ratio "r" of the CVT 14, where r=Nin/Nout, Nin representing the speed of the input shaft 30 while Nout representing the speed of the output shaft 38.

With the variable-diameter pulleys 40, 42 having the same diameter, the corresponding first and second hydraulic cylinders 54, 56 have a same pressure-receiving area. Usually, the tension of the transmission belt 44 is determined primarily by the pressure in one (hereinafter referred to as "driven side cylinder") of the first and second hydraulic cylinders 40, 42 which corresponds to the driven one of the pulleys 40, 42 (hereinafter referred to as "driven side pulley").

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which mesh with the inner planetary gear 62; a ring gear 68 meshing with the outer planetary gear 64; a REVERSE brake 70 for fixing the ring gear 68 to the housing of the transmission; and a FORWARD clutch 72 for connecting the carrier 60 and the input shaft 38.

The REVERSE brake 70 and FORWARD clutch 72 are hydraulically operated frictionally coupling devices. The reversing device 16 is placed in its neutral position when the brake 70 and the clutch 72 are both in their disengaged or released positions. In this state, the reversing device 16 does not transmit power to the intermediate gear device 18. When the FORWARD clutch 72 is engaged, the input and output shafts 38, 58 of the device 16 are connected to each other, whereby power is transmitted from the CVT 14 to the intermediate gear device 18, so as to drive the vehicle in the forward direction. When the REVERSE brake 70 is engaged, on the other hand, the direction of rotation of the output shaft 58 is reversed with respect to the direction of rotation of the input shaft 38, whereby power is transmitted so as to drive the vehicle in the reverse direction.

Since the reversing device 16 is placed in the neutral position when a shift lever 252 (which will be described) is placed in a neutral position N, this device 16 may function as a clutch disposed in series connection with the CVT 14, in a power transmitting line between the engine 10 and the drive wheels 24, for disconnecting the power transmitting line when the shift lever 252 is operated to the neutral position.

Figure 3:
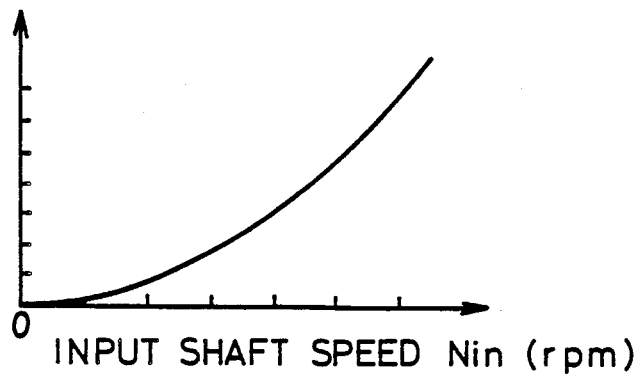
FIG. 3 is a graph indicating an input shaft speed pressure or first pressure produced by a pitot tube, which pressure varies with an input shaft speed of a continuously variable transmission of the power transmitting system of FIG. 1.
Figure 4:
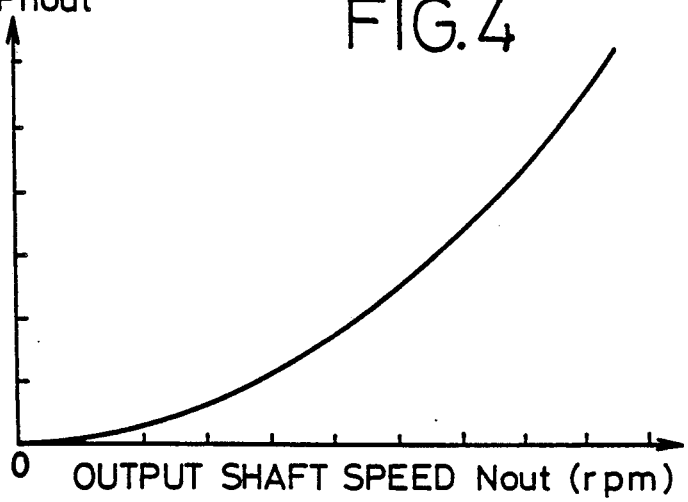
FIG. 4 is a graph indicating an output shaft speed pressure or second pressure produced by another pitot tube, which pressure varies with an output shaft speed of the continuously variable transmission.

The stationary rotors 46, 48 of the CVT 14 have respective annular members 78, 80 at their periphery, for defining respective annular grooves 74, 76 which are open in the radially inward direction. A lubrication oil is supplied to a lower portion of these grooves 74, 76, so that the grooves are filled with the oil by a centrifugal force during rotation of the rotors 46, 48. To detect the rotating speeds Nin and Nout of the input and output shafts 30, 38, pitot tubes 82, 84 are disposed such that the ends of the tubes are located within the annular grooves 74, 76. The pitot tubes 82, 84 produce an input shaft speed pressure or first pressure Pnin indicative of the speed Nin of the input shaft 30, and an output shaft speed pressure or second pressure Pnout indicative of the speed Nout of the output shaft 38, respectively. FIGS. 3 and 4 show the relationships between the input shaft speed pressure Pnin and the input shaft speed Nin, and between the output shaft speed pressure Pnout and the output shaft speed Nout. As indicated by the graphs of FIGS. 3 and 4, the pressures Pnin and Pnout increase with the input and output shaft speeds Nin and Nout, respectively.

Figure 2A:
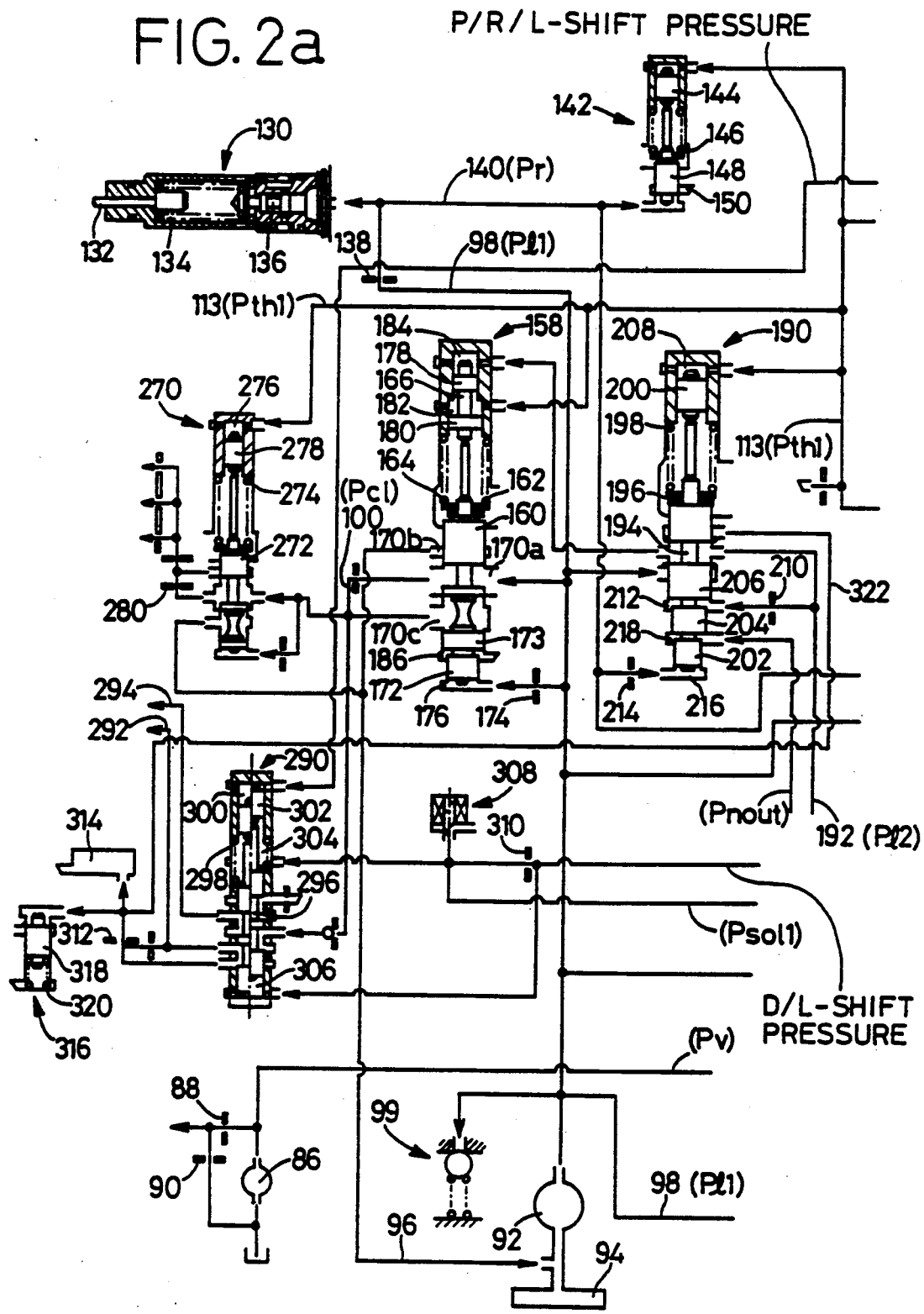
FIGS. 2a, 2b and 2c are views showing details of a hydraulic control circuit incorporated in the hydraulic control apparatus of FIG. 1.
Figure 5:
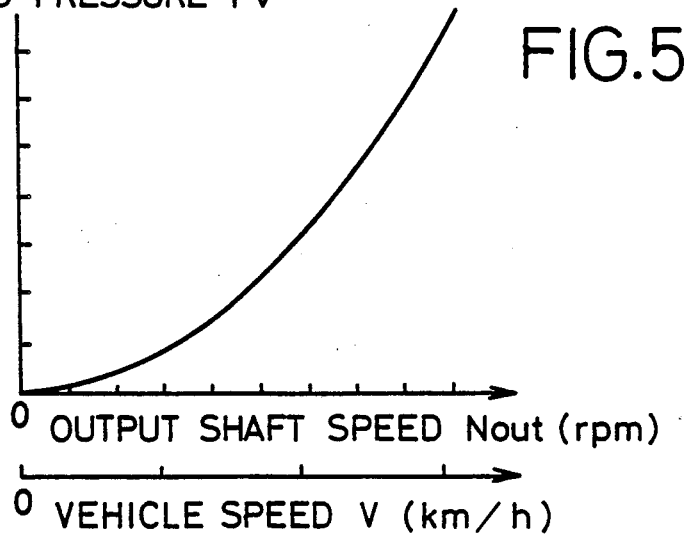
FIG. 5 is a graph indicating a vehicle speed pressure or third pressure produced by a vehicle-speed sensing pump shown in FIG. 2a, which pressure varies with the vehicle running speed.

To detect the running speed V of the vehicle, a vehicle-speed sensing pump 86 is connected to the shaft of the intermediate gear device 18. This pump 86 produces a vehicle speed pressure or third pressure Pv indicative of or corresponding to the vehicle running speed V. As shown in FIG. 2a, the fluid delivered from the vehicle-speed sensing pump 86 is returned to its reservoir through flow restrictors 88, 90. As indicated in FIG. 5 showing the relationship between the vehicle speed pressure Pv and the vehicle speed V, the pressure Pv increases with the speed V.

Figure 2B:
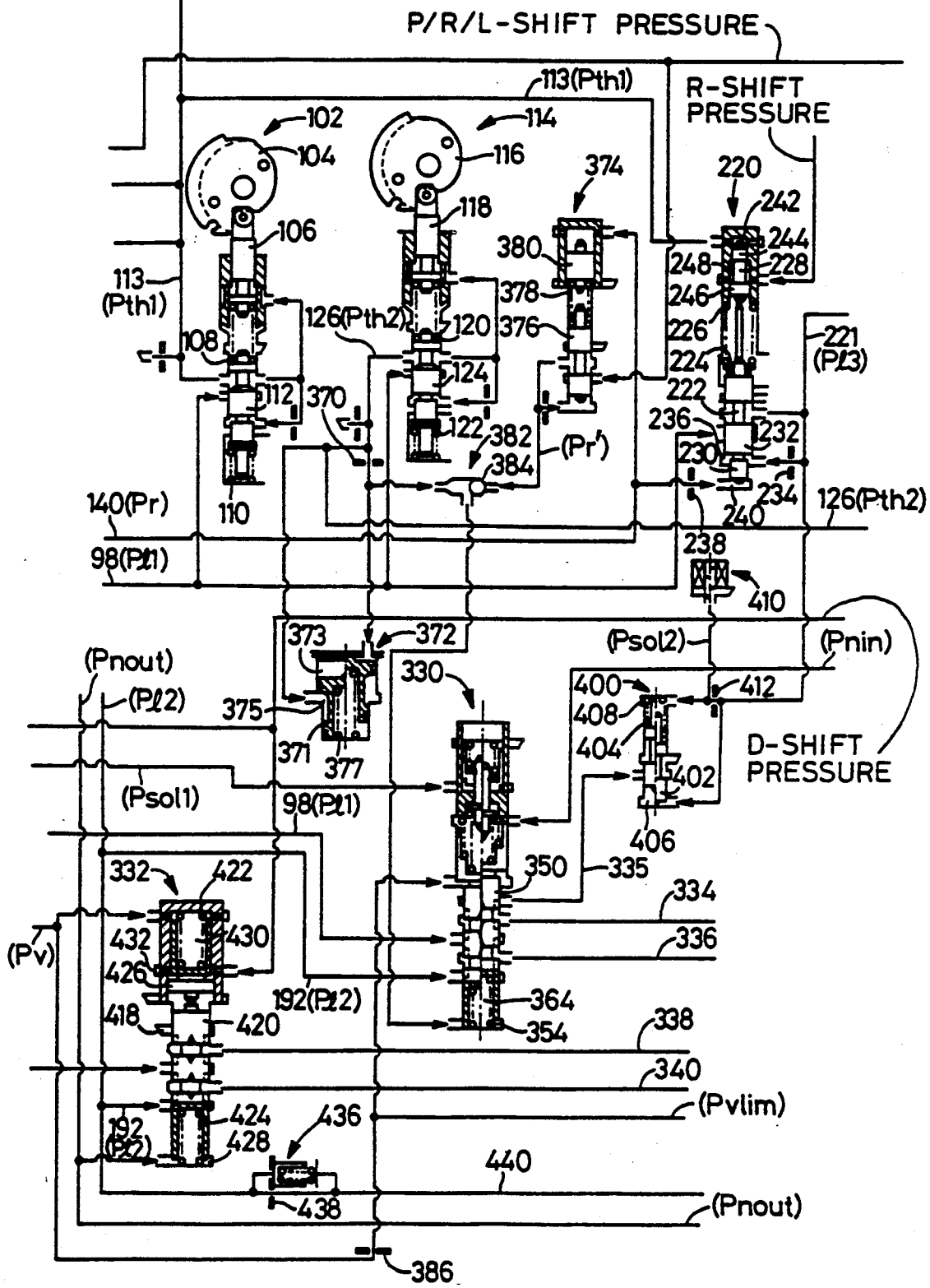
Figure 2C:
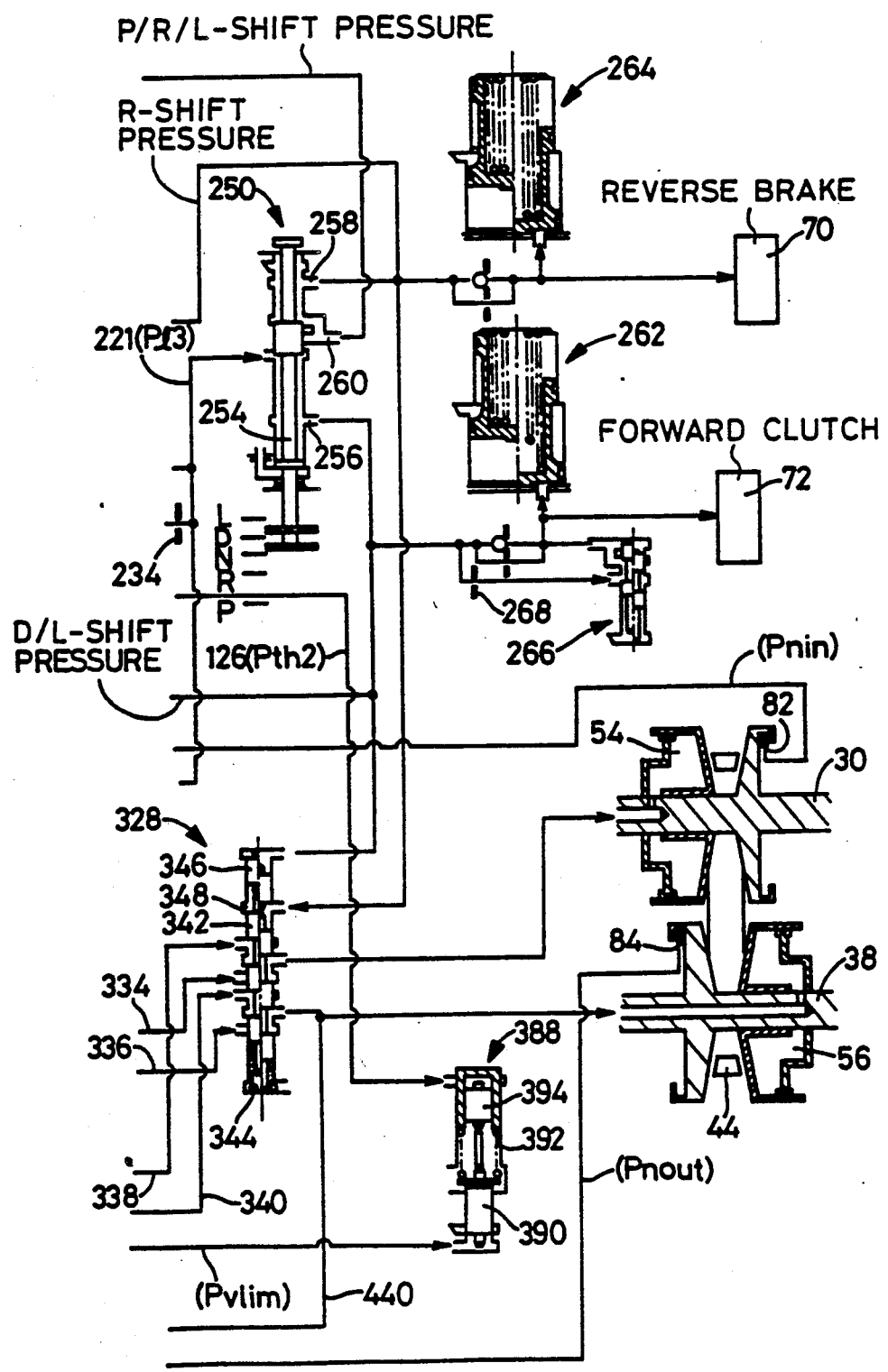

The power transmitting system constructed as described above is hydraulically controlled by a hydraulic control circuit 89, which is shown in detail in FIGS. 2a, 2b and 2c.

An oil pump 92 shown in FIG. 2a serves as a hydraulic power source of the hydraulic system, which constitutes a part of the hydraulic control apparatus constructed according to the present embodiment of the invention. The oil pump 92 is connected to the pump impeller 28 of the fluid coupling 12, so that the pump 92 is always rotated with the crankshaft 26 of the engine 10. In operation, the pump 92 pumps up a working fluid through a strainer 94 from a reservoir to which the fluid is returned. The pump 92 communicates with a return line 96, so that the fluid returned through the return line 96 is sucked into the pump 92. The pressurized fluid produced by the pump 92 is delivered as a first line pressure Pl1 into a first pressure line 98. In the present embodiment, the first line pressure Pl1 is regulated by an overflow or relief type first pressure regulating valve 158, which discharges the fluid in the first pressure line 98 into the return line 96 and a lock-up clutch line 100. The first pressure line 98 is provided with a relief valve 99 for releasing the pressure in the line 98 when the delivery pressure of the pump 92 exceeds a given limit.

There will first be described various hydraulic components which produce respective hydraulic signals, i.e., first throttle pressure Pth1, second throttle pressure Pth2, speed-ratio pressure Pr and clutch pressure Pcl.

Figure 6:
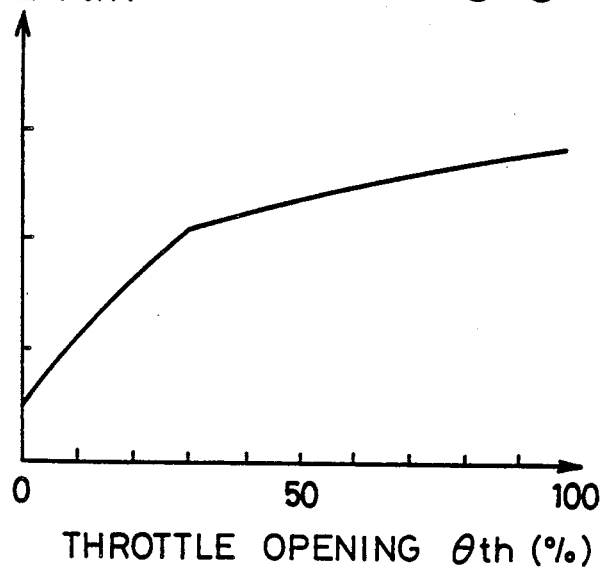
FIG. 6 is a graph indicating a first throttle pressure produced by a first throttle sensing valve shown in FIG. 2b, which pressure varies with the amount of opening of a throttle valve of the vehicle engine.

The first throttle pressure Pth1 indicative of an output torque of the engine 10 is produced by a first throttle sensing valve 102 shown in FIG. 2b. The first throttle sensing valve 102 includes: a cam 104 rotated as the throttle valve of the engine 10 is operated; a plunger 106 which engages a cam surface of the cam 104 and which is axially moved by a distance corresponding to an angle of rotation of the cam 104; a spring 108; and a valve spool 112 which receives a thrust through the spring 108 from the plunger 106, and a thrust due to the first line pressure Pl1. These two thrust forces act on the spool 112 in the opposite directions. The valve spool 112 is moved to a position of equilibrium of the above two thrust forces, whereby the first line pressure P(1 is reduced so as to produce the first throttle pressure Pth1 corresponding to the output torque of the engine 10. The relationship between the first throttle pressure Pth1 and an actual opening θth of the throttle valve is indicated in FIG. 6. The curvature of the cam surface of the cam 104 is determined based on the output characteristic of the engine 10, so that the first throttle pressure Pth1 corresponds to or represents the output torque of the engine 10. The first throttle pressure Pth1 is delivered through a first throttle pressure line 113.

Figure 7:
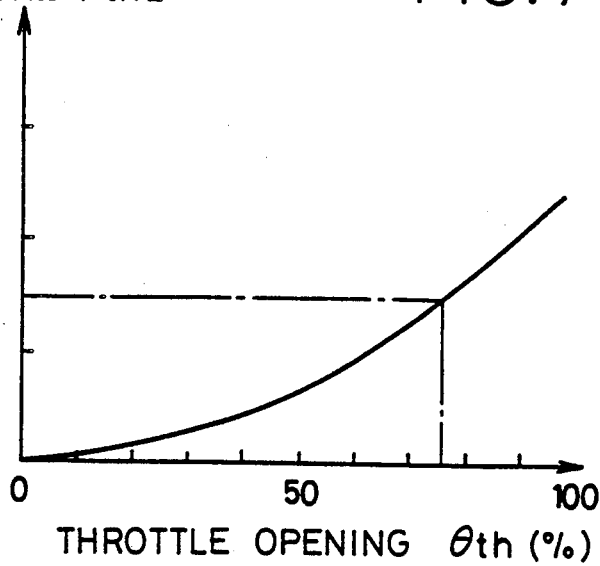
FIG. 7 is a graph indicating a second throttle pressure produced by a second throttle sensing valve shown in FIG. 2b, which pressure varies with the amount of the throttle valve opening.

The second throttle pressure Pth2 corresponds to or represents the actual opening θth of the throttle valve of the engine 10 or the amount of operation of an accelerator pedal, which represents the output of the engine 10 currently required or desired by the vehicle operator or driver. This pressure Pth2 is produced by a second throttle pressure sensing valve 114 which includes: a cam 116 rotated as the throttle valve of the engine 10 is operated; a plunger 118 which engages a cam surface of the cam 116 and which is axially moved by a distance corresponding to an angle of rotation of the cam 116; springs 120, 122; and a valve spool 124 which receives a thrust through the spring 120 from the plunger 118, and a thrust consisting of a feedback pressure in the form of the second throttle pressure Pth2 and a biasing force of the spring 122. These two thrust forces act on the spool 124 in the opposite directions. The valve spool 124 is moved to a position of equilibrium of the above two thrust forces, whereby the first line pressure Pl1 is reduced so as to produce the second throttle pressure Pth2 corresponding to the throttle valve opening θth. The relationship between the second throttle pressure Pth2 and the actual throttle valve opening θth is indicated in FIG. 7. The curvature of the cam surface of the cam 116 is determined so that the second throttle pressure Pth2 permits the CVT 14 to be controlled so as to assure high fuel economy and drivability of the vehicle. The second throttle pressure Pth2 is delivered through a second throttle pressure line 126.

Figure 8:
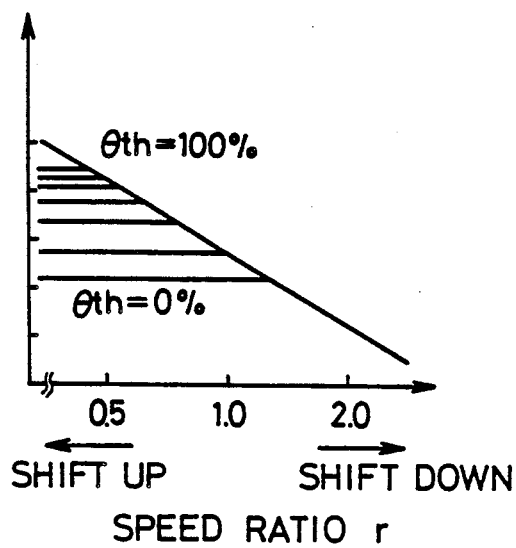
FIG. 8 is a graph indicating a speed-ratio pressure produced by a speed-ratio sensing valve and a limit valve shown in FIG. 2a, which pressure varies with the speed ratio of the continuously variable transmission.

The speed-ratio pressure Pr indicative of the speed ratio "r" of the CVT 14 is produced by a speed ratio sensing valve 130 shown in FIG. 2a. This valve 130 includes: a sensing rod 132 which slidably contacts the axially movable rotor 50 on the input shaft 30 of the CVT 14 and which is axially displaced by a distance equal to an amount of axial movement of the movable rotor 50; a spring 134 whose biasing force varies as the axial position of the rod 132 is changed; and a valve spool 136 which receives the biasing force of the spring 134 and the first line pressure Pl1. The valve spool 136 is moved to a position of equilibrium of the biasing force of the spring 134 and a thrust force based on the first line pressure Pl1, whereby the amount of discharge flow of the fluid from the first pressure line 98 into the drain is adjusted depending upon the speed ratio "r" of the CVT 14. For example, as the movable rotor 50 is moved toward the stationary rotor 46 so as to reduce the effective width of the V-groove of the pulley 40 and thereby decrease the speed ratio "r", the sensing rod 132 is moved in a direction to compress the spring 134, thereby reducing the rate of flow of the fluid which is supplied from the first pressure line 98 through an orifice 138 and discharged into the drain by a resulting movement of the valve spool 136. As a result, the pressure in a portion of the line 98 downstream of the orifice 138 is increased. This pressure is utilized as the speed-ratio pressure Pr, which increases with a decrease in the speed ratio "r" of the CVT 14, as indicated in FIG. 8, i.e., increases as the CVT 14 is shifted up. The speed-ratio pressure Pr is delivered through a speed ratio pressure line 140, which is connected to a limit valve 142. The speed-ratio pressure Pr is limited by the limit valve 142, depending upon the first throttle pressure Pth1, so that the second line pressure Pl2 is controlled to control the tension of the belt 44 to an optimum value. The limit valve 142 includes: a plunger 144 which receives the first throttle pressure Pth1; a spring 146; and a valve spool 148 which receives the first throttle pressure Pth1 through the spring 146, and the speed-ratio pressure Pr. The valve spool 148 is moved to a position of equilibrium between the thrust based on the first throttle pressure Pth1 and spring 146, and the thrust based on the speed-ratio pressure Pr. When the latter thrust exceeds the former thrust, the fluid is discharged from the speed ratio pressure line 140 into the drain, in order to prevent a further increase in the speed-ratio pressure Pr. The upper limit of the pressure Pr is increased with an increase in the first throttle pressure Pth1.

There will next be described hydraulic components for regulating the first line pressure Pl1, second line pressure Pl2, third line pressure Pl3 and clutch pressure Pcl.

The first line pressure Pl1 is regulated by a first pressure regulating valve 158. This valve 158 includes a valve spool 160, a spring seat 162, a return spring 164 and a plunger 166. The valve spool 160 is operated to effect selective connection and disconnection of a port 170a communicating with the first pressure line 98, to and from a drain port 170b, or a port 170c communicating with the lock-up clutch line 100. The valve spool 160 has a first land 172 at one axial end thereof remote from the plunger 166. Adjacent to the first land 172 of the spool 160, there is formed a chamber 176 which receives as a feedback pressure the first line pressure Pl1 through a flow restrictor 174 The valve spool 160 is biased toward its open position by this first line pressure Pl1. The plunger 166, which is coaxial with the valve spool 160, has a first land 178 and a second land 180 which cooperate with each other to define a chamber 182 adapted to receive the first throttle pressure Pth1. Adjacent to the end of the first land 178 remote from the second land 180, there is formed a chamber 184 adapted to receive the second line pressure Pl2. The biasing force of the return spring 164 acts on the valve spool 160 through the valve seat 162 so as to bias the spool 160 toward its closed position. The valve spool 160 is positioned under equilibrium of forces according to the following equation (1):

$$Pl1 = [Pl2 \cdot A3 + Pth1(A4 - A3) + W]/A1 \qquad (1)$$

where,

A1: pressure-receiving area of the first land 172 of the valve spool 160

A3: cross sectional area of the first land 178 of the plunger 166

A4: cross sectional area of the second land 180 of the plunger 166

W: biasing force of the return spring 164.

Thus, the first line pressure Pl1 is regulated by the first pressure regulating valve 158. A chamber 186 formed between the first land 172 and a second land 173 of the valve spool 160 is connected to the drain and exposed to the atmosphere.

As is apparent from the equation (1), the first line pressure Pl1 is regulated depending upon the second line pressure Pl2 and the first throttle pressure Pth1 such that the pressure Pl1 is higher than the pressure Pl2 by a suitable amount and increases with the first throttle pressure Pth1. Accordingly, the CVT 14 whose first and second hydraulic cylinders 54, 56 have the same pressure receiving area can be operated with the speed ratio "r" varying over a sufficiently wide range with a sufficiently high response. Further, the first line pressure Pl1 is controlled to a required minimum level, so as to minimize the power loss of the vehicle. It is noted that the chamber 184 is not adapted to receive the input side cylinder pressure Pin, in order to prevent an increase in the first line pressure Pl1 to the maximum level upon rapid acceleration of the vehicle.

Then, a second pressure regulating valve 190 for producing and regulating the second line pressure Pl2 will be described. This valve 190 includes a valve spool 194 for effecting connection and disconnection of the first pressure line 98 to and from a second pressure line 192, a spring seat 196, a return spring 198 and a plunger 200. The valve spool 194 is provided at one axial end thereof remote from the plunger 200, with a first land 202, a second land 204 and a third land 206, which have different diameters. The first land 202 has the smallest diameter, and the second land 204 has the diameter larger than the first land 202, while the third land 206 has the largest diameter. Between the second and third lands 204, 206, there is formed a chamber 212 to which is applied as a feedback pressure the second line pressure Pl2 through a flow restrictor 210, so that the valve spool 194 is biased toward its closed position by the second line pressure Pl2. Another chamber 216 is formed adjacent to the first land 202 of the valve spool 194 remote from the second land 204. To this chamber 216, there is applied the speed-ratio pressure Pr through a flow restrictor 214, so that the valve spool 194 is biased toward the closed position by the speed-ratio pressure Pr. Between the first and second lands 202, 204, there is formed a chamber 218 adapted to receive the output shaft speed pressure Pnout described above, so that the valve spool 194 is biased toward the closed position by the pressure Pnout. The return spring 198 acts on the valve spool 194 through the spring seat 196, to bias the spool 194 toward its open position. Adjacent to the end of the plunger 200 remote from the spool 194, there is formed a chamber 208 adapted to receive the first throttle pressure Pth1, so that the spool 194 is biased by the pressure Pth1 toward its open position.

The valve spool 194 is positioned under equilibrium of forces according to the following equation (2):

$$Pl2 = [A8 \cdot Pth1 + W - A5 \cdot Pr - (A6 - A5)Pnout]/(A7 - A6) \qquad (2)$$

where,

A5: pressure-receiving area of the first land 202

A6: cross sectional area of the second land 204

A7: cross sectional area of the third land 206

A8: pressure-receiving area of the plunger 200

W: biasing force of the return spring 198

Figure 9:
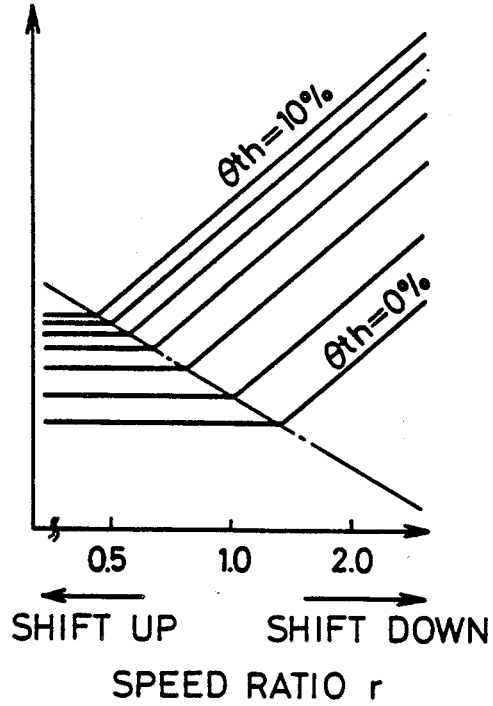
FIG. 9 is a graph indicating a second line pressure produced by a second pressure regulating valve shown in FIG. 2a, which varies with the transmission speed ratio.

With the valve spool 194 moved according to the equation (2), the first line pressure Pl1 is lowered to provide the second line pressure Pl2. Since the second pressure line 192 is a comparatively closed path, the second pressure regulating valve 190 is adapted to lower the comparatively high first line pressure Pl1 into the comparatively low second line pressure Pl2, as indicated in FIG. 9.

It will be understood from the above equation (2) that the second line pressure Pl2 is controlled to a level suitable for giving an optimum tension to the transmission belt 44, with the speed-ratio pressure Pr limited by the limit valve 142, and such that the pressure Pl2 varies with the first throttle pressure Pth1. It is also noted that the second line pressure Pl2 varies with the output shaft speed pressure Pnout such that the pressure Pl2 decreases with an increase in the output shaft speed pressure Pnout, to thereby effect compensation for an increase in the tension of the belt 44 due to the increase in the pressure in the second hydraulic cylinder 56 due to the centrifugal force during rotation of the cylinder 56. A line 322 adapted to receive the fluid discharged from the second pressure regulating valve 190 is connected to the input side of an oil cooler 314 (which will be described). The lowest possible level of the second line pressure Pl2 is determined to be higher than the pressure in the oil cooler 314, so that the lowest level of the pressure Pl2 established due to the compensation for the pressure increase of the cylinder 56 by the centrifugal force indicated above will not cause air cavities or bubbles within the cylinder 56.

Figure 10:
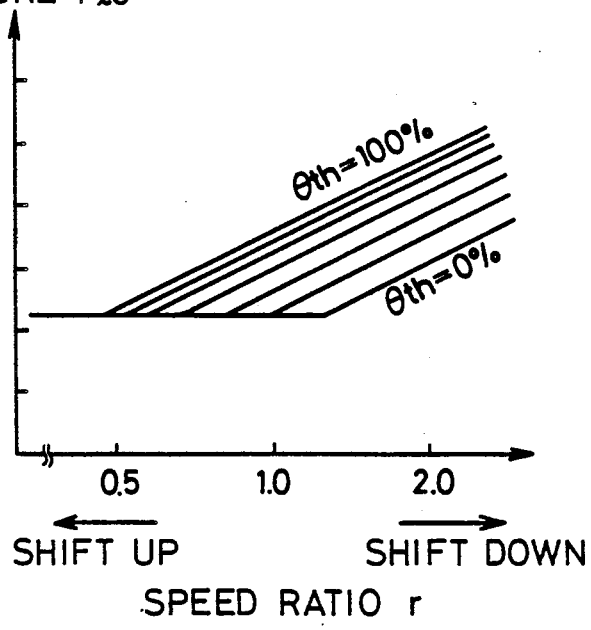
FIG. 10 is a graph indicating a third line pressure produced by a third pressure regulating valve shown in FIG. 2b, which pressure varies with the transmission speed ratio.

A third pressure regulating valve 220 is provided to regulate the third line pressure Pl3 suitable for operating the REVERSE brake 70 and FORWARD clutch 72 of the reversing device 16. This valve 220 includes a valve spool 222 for effecting connection and disconnection between the first pressure line 98 and a third pressure line 221, a spring seat 224, a return spring 226 and a plunger 228. The valve spool 222 has a first land 230 and a second land 232 which cooperate to define a chamber 236 adapted to receive as the feedback pressure the third line pressure Pl3 through a flow restrictor 234, so that the spool 222 is biased by the pressure Pl3 toward its closed position. Adjacent to the end of the first land 230 remote from the second land 232, there is formed a chamber 240 adapted to receive the speed-ratio pressure Pr through a flow restrictor 238, so that the spool 222 is biased by the pressure Pr toward its closed position. The biasing force of the return spring 226 acts on the spool 222 through the spring seat 224, so that the spool 222 is biased by the spring 226 toward its open position. Adjacent to the end of the plunger 228 remote from the spool 222, there is formed a chamber 242 adapted to receive the first throttle pressure Pth1, so that the spool 222 is biased by the pressure Pth1 toward its open position. The plunger 228 has a first land 244 and a second land 246 having a larger diameter than the first land 244. Between these first and second lands 244, 246, there is formed a chamber 248 adapted to receive a R-shift pressure (=third line pressure Pl3) which is produced by a manual valve 250 when the shift lever 252 is operated to a REVERSE position "R". With the third pressure regulating valve 220 constructed as described above, the third line pressure Pl3 is regulated to an optimum level based on the speed-ratio pressure Pr and the first throttle pressure Pth1, as shown in FIG. 10, according to an equation similar to the above equation (1) for the first line pressure Pl1. The optimum level of the pressure Pl3 is the minimum level required to operate the FORWARD clutch 72 and REVERSE brake 70 to transmit the torque without a slip. When the reversing device 16 is placed in the reverse position, the third line pressure Pl3 is applied to the chamber 248, to increase the force biasing the spool 222 toward its open position, thereby almost doubling the third line pressure Pl3. In this case, the lines in the graph of FIG. 10 indicative of the third line pressure Pl3 are shifted upward in the graph. Consequently, the torque transmitting capacity of the clutch 72 and brake 70 is adjusted depending upon the direction in which the torque is transmitted for the forward or reverse running of the vehicle.

The third line pressure Pl3 thus regulated is applied to the manual valve 250 shown in FIG. 2c. This valve 250 has a valve spool 254 which is moved in response to the operation of the shift lever 252, which has five operating positions, i.e., NEUTRAL "N", PARKING "P", LOW "L", DRIVE "D" and REVERSE "R". When the shift lever 252 is placed in the LOW or DRIVE position "L", "D", the manual valve 250 delivers a D/L-shift pressure equal to the third line pressure Pl3 from an output port 256 to the FORWARD clutch 72, while allowing the fluid to be discharged from the REVERSE brake 70. When the shift lever 252 is placed in the REVERSE position "R", the manual valve 250 delivers a R-shift pressure also equal to the third line pressure Pl3 from an output port 258 to the REVERSE brake 70, while allowing the fluid to be discharged from the FORWARD clutch 72. When the shift lever 252 is placed in the NEUTRAL position "N", the manual valve 250 permits the fluid to be discharged from both of the brake 70 and clutch 72. The manual valve 250 also has an output port 260 from which a P/R/L-shift pressure is delivered when the shift lever 252 is placed in one of the LOW, REVERSE and PARKING positions "L", "R" and "P". Accumulators 262, 264 are connected to the clutch 72 and brake 70, respectively, for smoothly and gradually increasing the pressures applied to the clutch and brake 72, 70, to assure smooth frictional engagement of the clutch and brake 72, 70.

A shift timing valve 266 shown in FIG. 2c is connected to a line connected to the clutch 72 and accumulator 262. Initially, the shift timing valve 266 is in a position indicated by the left half as shown in FIG. 2c, in which a flow restrictor 268 is open, allowing the fluid to be fed to the clutch 72 at a comparatively high rate. Subsequently, the valve 266 is operated to a position indicated by the right half as shown in FIG. 2c, in which the flow restrictor 268 is closed to restrict the fluid flow into the clutch 72.

The pressure of the fluid delivered from the port 170a of the first pressure regulating valve 158 is regulated by a lock-up pressure regulating valve 270 shown in FIG. 2a, into the lock-up clutch pressure Pcl suitable for operating the lock-up clutch 36 of the fluid coupling 12. The lock-up clutch pressure regulating valve 270 has a valve spool 272 which receives as the feedback pressure the lock-up clutch pressure Pcl so that the spool 272 is biased by the pressure Pcl toward its closed position. The valve 270 also has a spring 274 biasing the spool 272 toward its closed position, a chamber 276 adapted to receive the first throttle pressure Pth1, and a plunger 278 which receives the first throttle pressure Pth1 in the chamber 276 to bias the spool 272 toward the closed position. The valve spool 272 is positioned under equilibrium between the thrust based on the feedback pressure Pcl and the thrust based on the biasing force of the spring 274 and the first throttle pressure Pth. As a result, the pressure in the lock-up clutch line 100 is released through the valve 270 and a flow restrictor 280, to thereby regulate the lock-up clutch pressure Pcl. The fluid discharged from the line 100 through the valve 270 is partly used as a lubricant for the CVT 14, reversing device 16 and other members of the power transmitting system, and is returned to the pump 92 through the return line 96.

The lock-up clutch pressure Pcl thus regulated by the valve 270 is supplied to a lock-up clutch control valve 290, so that the pressure Pcl is selectively fed into one of an engaging line 292 and a releasing line 294 which are connected to the engaging and releasing chambers 33, 35 of the fluid coupling 12, respectively, for engaging and disengaging the lock-up clutch 36.

The lock-up clutch control valve 290 has a valve spool 296 for connecting the lock-up clutch line 100 selectively to the engaging or releasing line 292, 294, a spring 298 biasing the spool 296 toward its releasing position, and a chamber 300 which is adapted to receive the P/R/L-shift pressure (third line pressure Pl3) from the output port 260 of the manual valve 250 when the shift lever 252 is placed in one of the PARKING, REVERSE and LOW positions "P", "R", "L". The chamber 300 is connected to the drain when the shift lever 252 is placed in the other positions. The lock-up clutch control valve 290 also has a plunger 302 adapted to receive the P/R/L-shift pressure in the chamber 300 to bias the spool 296 toward the releasing position, a chamber 304 defined between the spool 296 and the plunger 302 to receive a first signal pressure Psol1, and a chamber 306 adapted to receive a D/L-shift pressure to bias the spool 296 toward its engaging position. The first signal pressure Psol1 is produced when the pressure between a flow restrictor 310 and the valve 290 is equal to the D/L-shift pressure (third line pressure Pl3) while a normally closed first solenoid-operated valve 308 is in the off or deenergized position. While the first solenoid-operated valve 308 is in the on or energized position, the pressure downstream of the restrictor 310 is released to the drain through the valve 308, and the first signal pressure Psol1 is not produced.

While the D/L-shift pressure is present, the first signal pressure Psol1 is not produced if the first solenoid-operated valve 308 is on. In this condition, therefore, the valve spool 296 is moved to the engaging position, whereby the lock-up clutch pressure Pcl is applied to the engaging chamber 33 through the lock-up clutch control valve 290 and the engaging line 292, while at the same time the fluid in the releasing chamber 35 is discharged through the releasing line 294 and the valve 290. When the first solenoid-operated valve 308 is turned off, on the other hand, the first signal pressure Psol1 is produced, and the spool 296 is therefore moved to the releasing position. As a result, the lock-up clutch pressure Pcl is applied to the releasing chamber 35 through the lock-up clutch control valve 290 and the releasing line 294, while at the same time the fluid in the engaging chamber 33 is discharged to the drain through the engaging line 292, the valve 290, flow restrictor 312 and oil cooler 314.

While the P/R/L-shift pressure is present, the valve spool 296 is moved to the releasing position to release the lock-up clutch 36. Even if the valving member of the first solenoid-operated valve 308 is stuck, or kept in the on position due to electrical abnormality, the lock-up clutch 36 is released upon operation of the shift lever 252 to the LOW position "L".

Between the flow restrictor 312 and the oil cooler 314, there is provided a cooler pressure control valve 316 for maintaining the input pressure of the oil cooler 314. The control valve 316 includes a valve spool 318 which is adapted to receive the pressure of the oil cooler 314 and biased by this pressure toward its open position, and a spring 320 biasing the spool 318 toward its closed position. When the thrust based on the oil cooler pressure exceeds the thrust based on the spring 320, the spool 318 is moved to the open position, whereby the fluid in the line connected to the oil cooler 314 is discharged to the drain through the valve 316.

The fluid flows into and out of the first and second hydraulic cylinders 54, 56 are controlled by a switching valve 328 (shown in FIG. 2c), a first shift control valve 330 (FIG. 2b), a second shift control valve 332 (FIG. 2b) and the valves associated with the valves 328, 330, 332.

The switching valve 328 includes a valve spool 342 which is movable between a running position and a neutral position. In the neutral position, a first cylinder line 334 and a second cylinder line 336 which are connected to output ports of the first shift control valve 330 are connected to the first and second hydraulic cylinders 54, 56 of the CVT 14, respectively. In the neutral position, a third cylinder line 338 and a fourth cylinder line 340 which are connected to output ports of the second shift control valve 332 are connected to the first and second hydraulic cylinders 54, 56, respectively. The switching valve 328 further includes a spring 344 biasing the spool 342 toward the neutral position, and a plunger 346 adapted to receive the D/L-shift pressure to bias the spool 342 toward the running position. Between the plunger 346 and the spool 342, there is formed a chamber 348 adapted to receive the R-shift pressure to bias the spool 342 toward the running position. When the shift lever 252 is placed in one of the DRIVE, LOW and REVERSE positions "D", "L", "R", the first shift control valve 330 is enabled or placed in the operative position. When the shift lever 252 is placed in the NEUTRAL position "N", the second shift control valve 332 is enabled or placed in the operative position. The neutral position of the spool 342 is indicated by the left half as shown in FIG. 2c, and the running position (for the DRIVE or LOW position "D", "L") is indicated by the right half as shown in the same figure.

Figure 16:
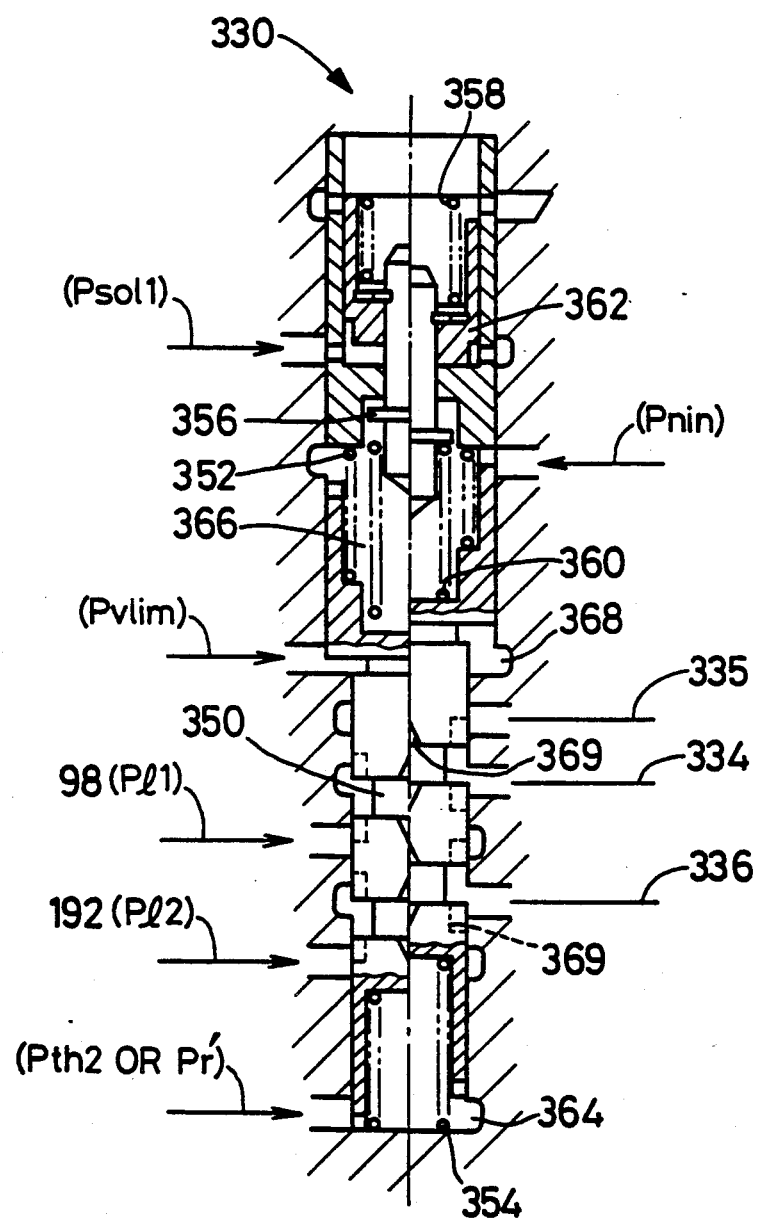
FIGS. 16 and 17 are enlarged cross sectional views of the first and second shift control valves, respectively.

As shown in detail in FIG. 16, the first shift control valve 330 includes a valve spool 350 which is movable between a shift-down position for connecting the first cylinder line 334 to a drain line 335 and connecting the second cylinder line 336 to the first pressure line 98, and a shift-up position for connecting the first cylinder line 334 to the first pressure line 98 and connecting the second cylinder line 336 to the second pressure line 192. The valve 330 also includes an upper neutral spring 352 biasing the spool 350 toward the shift-up position (lower position as seen in FIG. 16), a lower neutral spring 354 biasing the spool 350 toward the shift-down position, a return spring 358, a gain changing spring 360, and a piston 362 having a spring seat 356 which bears one end of the gain changing spring 360. The piston 362 is adapted to receive the first signal pressure Psol1 and moved by this pressure against a biasing action of the return spring 358 in a direction away from the spool 350. When the first signal pressure Psol1 is not present, the piston 362 is moved toward the spool 350 by the biasing force of the return spring 358, to thereby compress the gain changing spring 360 between the spool 350 and the spring seat 356, for enabling the spring 360 to function. The first shift control valve 330 has a chamber 364 which is formed adjacent to the end of the spool 350 on the side of the lower neutral spring 354. The chamber 364 is adapted to receive a higher one of the second throttle pressure Pth2 and a modified speed-ratio pressure Pr'. The valve 330 also has a chamber 366 formed adjacent to the end of the spool 350 on the side of the upper neutral spring 352 adapted to receive the input shaft speed pressure Pnin, and a chamber 368 formed between a large-diameter and a small-diameter portion of the spool 350. The chamber 368 is adapted to receive the vehicle speed pressure Pvlim. The spool 350 in its shift-up position is indicated to the left of a centerline in FIG. 16, while the spool 350 placed in its shift-down position is indicated to the right of the centerline in the same figure. Each of the lands of the spool 350 has a V-shaped notch 369 for gradually changing the area of fluid flow through the valve 330 as the spool 350 is moved.

Figure 21:
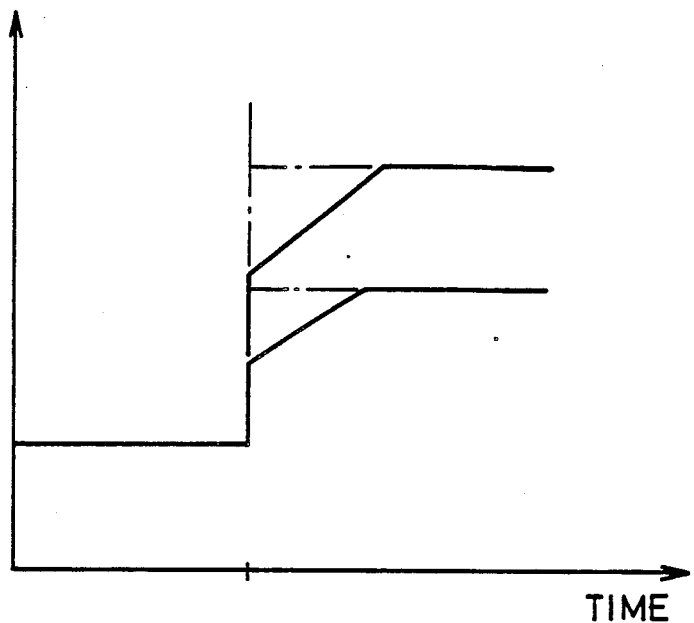
FIG. 21 is a graph explaining an operation of an accumulator for reducing the second throttle pressure.

The second throttle pressure Pth2 is applied to the the chamber 364 of the first shift control valve 330 through a flow restrictor 370. An accumulator 372 is connected to a line between the restrictor 370 and the chamber 364, so that the accumulator 372 functions to achieve a gradual initial increase in the pressure Pth2 as applied to the chamber 364. The accumulator 372 includes a stepped piston 371 having a large-diameter portion and a small-diameter portion. Adjacent to the end of the large-diameter portion of the stepped piston 371, there is formed an accumulating chamber 373 communicating the line between the restrictor 370 and the valve 330. Around the small-diameter portion of the stepped piston 371, there is formed a back-pressure chamber 375 communicating with a line between the restrictor 370 and the second throttle sensing valve 114. The accumulator 372 also has a spring 377 biasing the stepped piston 371 toward the accumulating chamber 373. Since the second throttle pressure Pth2 is applied to the back-pressure chamber 375 without passing through the restrictor 370, the second throttle pressure Pth2 as applied to the chamber 364 suddenly rises to a given level upon commencement of application of the pressure Pth2, and the rate of rise in the pressure Pth2 from that level to the nominal level as produced by the valve 114 is lowered as indicated by inclined solid lines in FIG. 21. The upper solid line in FIG. 21 shows a case where the amount of rise in the pressure Pth2 is relatively large with the accelerator pedal depressed by a relatively large amount, while the lower solid line in FIG. 21 shows a case where the amount of rise of the pressure Pth2 is relatively small with the accelerator pedal depressed by a relatively small amount. In the presence of the accumulator 372, the second throttle pressure Pth2 is gradually or slowly raised to assure a slow change in the speed ratio "r" of the CVT 14 even when the vehicle is rapidly accelerated. This arrangement assures a relatively small portion of the engine torque consumed for increasing the speed of the engine 10 per se, and a relatively large portion of the engine torque used as a force for driving the vehicle, thereby improving the drivability or acceleration performance of the vehicle.

Figure 11:
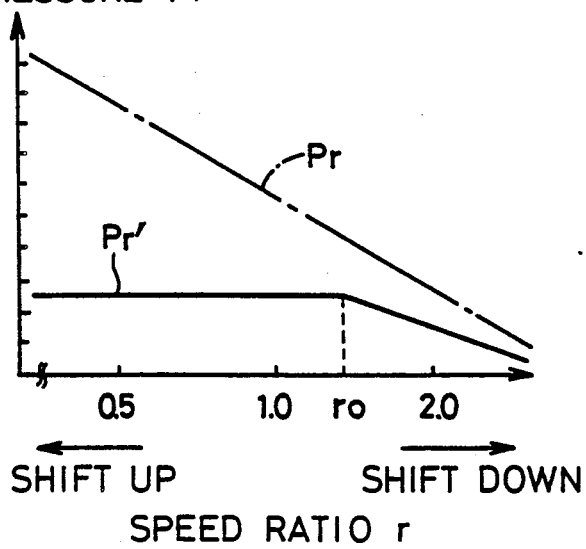
FIG. 11 is a graph indicating a modified speed-ratio pressure produced by a pressure reducing valve shown in FIG. 2b, which pressure varies with the transmission speed ratio.

The modified speed-ratio pressure Pr' indicated above is produced by a pressure reducing valve 374 shown in FIG. 2b, which receives the P/R/L-shift pressure. As indicated in FIG. 11, the modified speed-ratio pressure Pr' increases with an increase in the speed-ratio pressure Pr where the speed ratio "r" of the CVT 14 is larger than a predetermined value "ro", and is maintained at its maximum value where the speed ratio "r" is smaller than the predetermined value "ro". The pressure reducing valve 374 includes: a valve spool 376 adapted to receive as the feedback pressure the modified speed-ratio pressure Pr' such that the spool 376 is biased by this pressure Pr' toward its closed position; a spring 378 biasing the spool 376 toward its open position; and a plunger 380 disposed such that the spring 378 is interposed between the plunger 380 and the spool 376. The plunger 380 compresses the spring 378 to thereby increase the biasing force of the spring 378 as the speed-ratio pressure Pr increases. The movement of the plunger 380 toward the spool 376 is limited by abutting contact of the plunger 380 with the valve body, whereby the maximum biasing force of the spring 378 is limited. Namely, the solid line parallel to the abscissa of the graph of FIG. 11 indicates the maximum modified speed-ratio pressure Pr' established when the movement of the plunger 380 is stopped with its abutting contact with the valve body. The speed ratio "r" upon abutment of the plunger 380 with the valve body is the predetermined value "ro" indicated above.

Figure 22:
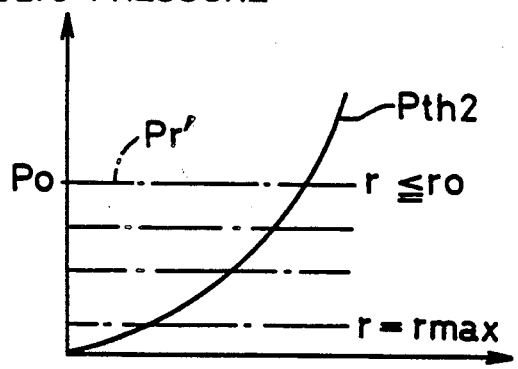
FIG. 22 is a graph explaining an operation of an OR valve shown in FIG. 2b.

The modified speed-ratio pressure Pr' is applied to an OR valve 382 shown in FIG. 2b. The OR valve 382 has a ball 384 which is moved by a difference between the second throttle pressure Pth2 and the pressure Pr', to close one of the two ports to which the lower one of the pressures Pth2 and Pr' is applied, so that the higher one of the pressures Pth2 and Pr' is applied to the chamber 364 of the first shift control valve 330. More specifically, the modified speed-ratio pressure Pr' varies with the speed ratio "r" while the second throttle pressure Pth2 varies with the throttle valve opening θth. Consequently, when the second throttle pressure Pth2 is lower than the modified speed-ratio pressure Pr', the pressure Pr' indicated above the curve Pth2 in FIG. 22 in place of the pressure Pth2 is applied to the first shift control valve 330. The OR valve 382 thus functions as means for selecting the higher one of the pressures Pth2 and Pr', as the pressure to be applied to the first shift control valve 330.

The vehicle speed pressure Pvlim is applied to the first shift control valve through the flow restrictor 386. Further, the maximum level of this vehicle speed pressure Pvlim is limited by the limit valve 388 shown in FIG. 2c. The limit valve 388 includes: a valve spool 390 biased toward its open position by the vehicle speed pressure Pvlim; a spring 392 biasing the spool 390 toward the closed position; and a plunger 394 adapted to receive the second throttle pressure Pth2 to bias the spool 390 toward the closed position. When the thrust based on the vehicle speed pressure Pvlim exceeds the thrust based on the biasing force of the spring 392 and the second throttle pressure Pth2, the vehicle speed pressure Pv is released to the drain at a point downstream of the flow restrictor 386. Thus, the maximum level of the vehicle speed pressure Pv is limited to the level Pvlim depending upon the throttle valve opening θth. The vehicle-speed sensing pump 86 producing the vehicle speed pressure Pv, the limit valve 388 and the flow restrictor 386 constitute means for producing the vehicle speed pressure Pv whose upper limit is determined by the throttle valve opening θth, namely, means for producing the vehicle speed pressure Pvlim.

Figure 12:
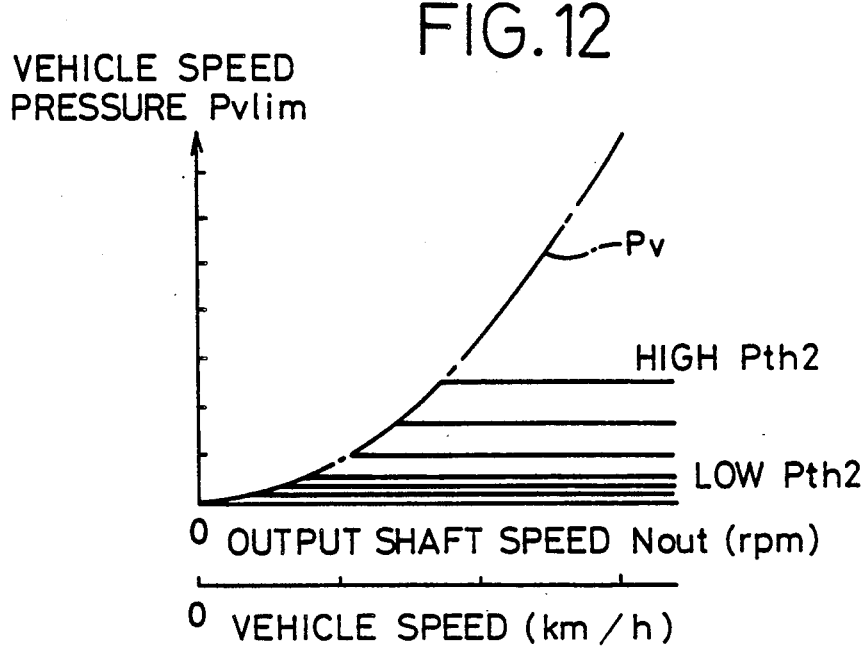
FIG. 12 is a graph indicating a vehicle speed pressure modified by a limit valve shown in FIG. 2c, which pressure varies with the vehicle speed.

According to the first shift control valve 330, when the second throttle pressure Pth2 is raised with the accelerator pedal being depressed while the vehicle is running with the shift lever 252 placed in the DRIVE, LOW or REVERSE position "D", "L", "R", the thrust for moving the valve spool 350 toward the shift-down position is increased, whereby the speeds of the engine 10 and input shaft 30 of the CVT 14, and the input shaft speed pressure Pnin are increased. The second throttle pressure Pth2 is raised with the accelerator pedal being depressed while the vehicle is running with the shift lever 252 placed in the DRIVE, LOW or REVERSE position "D", "L", "R". As the input shaft speed pressure Pnin is thus raised, the thrust for moving the spool 350 toward the shift-up position is then increased. As the accelerator pedal is depressed and the output torque of the engine 10 is increased, the vehicle speed is increased with the engine output torque, whereby the thrust for moving the spool 350 toward the shift-up position is increased. The spool 350 is positioned under equilibrium of the thrusts acting thereon in the opposite directions toward the shift-down and shift-up positions, so that the speed ratio "r" of the CVT 14 is determined by the equilibrium position of the spool 350. While the vehicle speed is relatively low, the speed Nin of the input shaft 30 is gradually increased as the vehicle speed V is increased, as indicated near the line "rmax" in the graph of FIG. 13. When the vehicle speed pressure Pvlim is raised to the upper limit corresponding to the second throttle pressure Pth2 (which represents the throttle valve opening θth, i.e., the currently required output of the engine 10) as indicated in FIG. 12, a further increase in the vehicle speed V will increase the thrust for moving the spool 350 toward the shift-up position. As a result, the speed ratio "r" of the CVT 14 is controlled such that the input shaft speed pressure Pnin is maintained at a constant level, as indicated by solid lines parallel to the abscissa of the graph of FIG. 13. Thus, the first shift control valve 330 is operated to control the speed Nin of the input shaft 30 of the CVT 14 according to an optimum relation among the input shaft speed Nin, vehicle speed V and throttle valve opening θth, so as to attain an optimum compromise between the fuel economy and drivability of the vehicle. That is, the first shift control valve 330 is adapted to operate in principle for controlling the speed ratio "r" of the CVT 14 in a feedback manner such that the actual input shaft speed Nin represented by the input shaft speed pressure Pnin coincides with a target value Nin* (an optimum value determined in terms of the fuel economy and drivability of the vehicle) which is determined by the second throttle pressure Pth2 and the vehicle speed pressure Pvlim.

Figure 13:
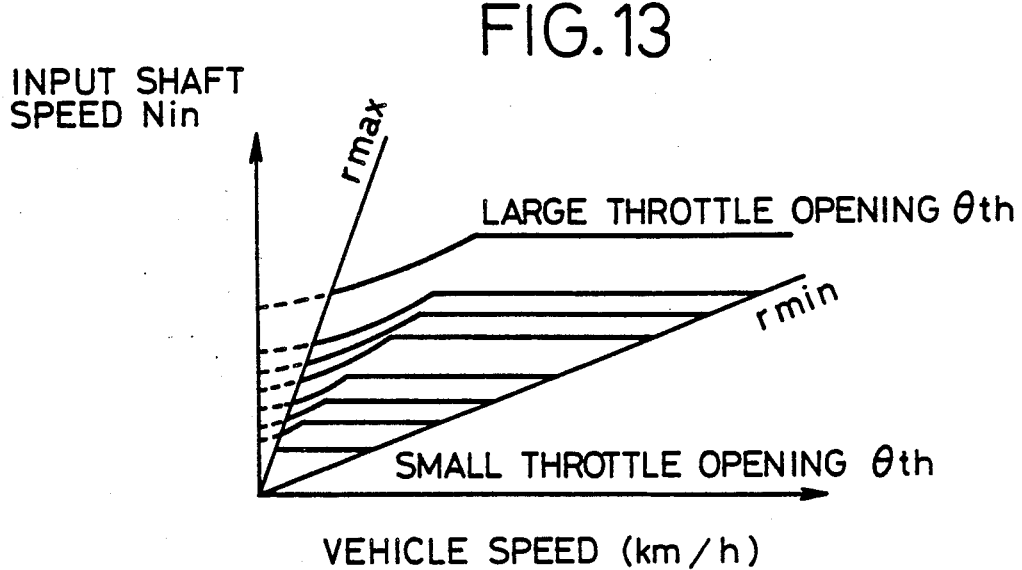
FIG. 13 is a graph indicating the input shaft speed of the transmission as controlled by a first shift control valve shown in FIG. 2b, in relation to the vehicle speed and the throttle opening.

As described above, however, the speed Nin of the input shaft 30 for a given throttle valve opening θth increases with an increase in the vehicle speed pressure Pvlim., i.e., with an increase in the vehicle speed V, when the vehicle speed V is increasing with the speed ratio "r" near the maximum value "rmax" indicated by the line "rmax" in FIG. 13. Thus, the speed ratio "r" is not controlled by the first shift control valve 330 such that the relationship between the vehicle speed V and the input shaft speed Nin is constant over the entire range of the vehicle speed V. This arrangement assures a low speed of the engine 10 and accordingly reduced operating noise of the engine 10 at a relatively low vehicle speed V, and permits the engine speed to increase for acceleration of the vehicle as the vehicle speed is raised. Thus, the control characteristic of the first shift control valve 330 as shown in FIG. 13 is advantageous over that of the conventional arrangement wherein the relationship between the input shaft speed and the vehicle speed is constant over the entire range of the vehicle speed.

Figure 14:
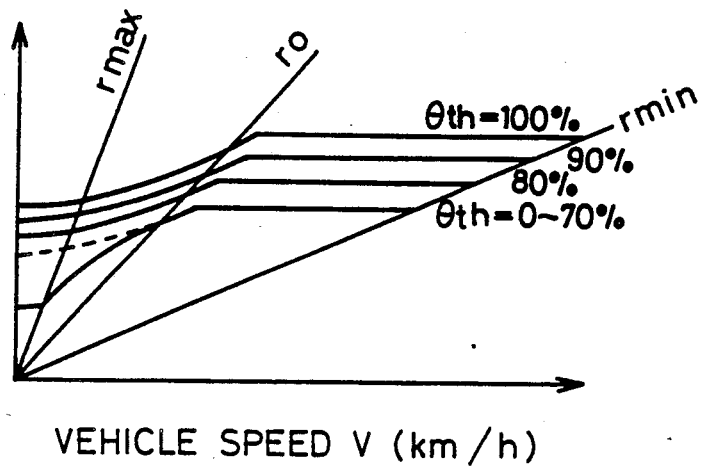
FIG. 14 is a graph indicating the input shaft speed of the transmission as controlled by a second shift control valve shown in FIG. 2b, in relation to the vehicle speed and the throttle opening.

When the shift lever 252 is placed in the LOW or REVERSE position "L", "R", the P/R/L-shift pressure is applied to the pressure reducing valve 374, and the modified speed-ratio pressure Pr' is produced by the pressure reducing valve 374, so that the higher one of the pressure Pr' and the second throttle pressure Pth2 is applied to the chamber 364 of the first shift control valve 330. Namely, the modified speed-ratio pressure Pr' is applied to the chamber 364 while the throttle valve opening θth is relatively low, except when the speed ratio "r" is close to the maximum value "rmax". This arrangement assures a sufficient engine braking effect during running of the vehicle in the LOW or REVERSE position "L", "R", where the throttle valve opening θth is small while the speed ratio "r" is close to the maximum value "rmax", as indicated by the lines "rmax", "ro" and "θth=0~70%" in FIG. 14.

Figure 15:
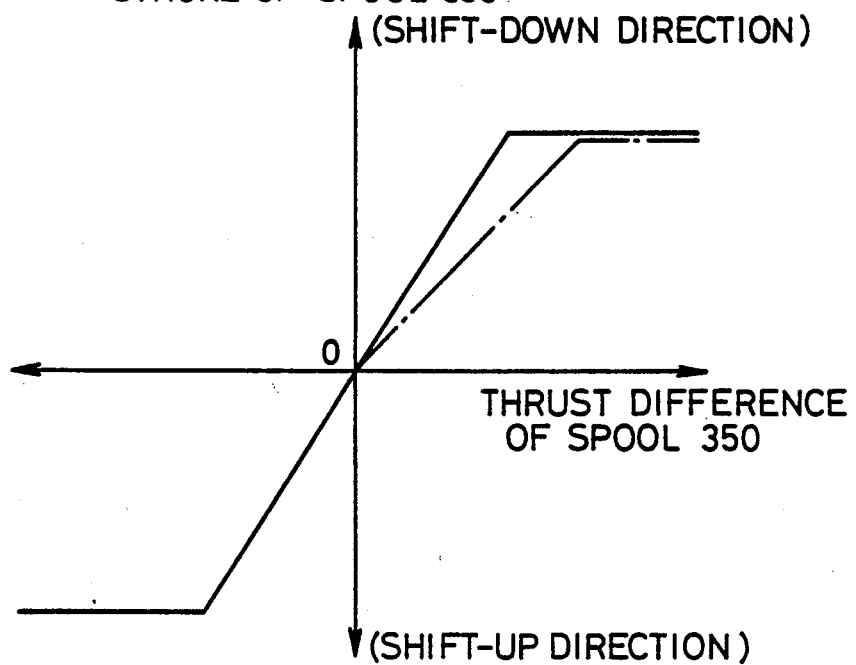
FIG. 15 is a graph indicating the operating characteristic of the first shift control valve shown in FIG. 16 in enlargement.

When the first signal pressure Psol1 for releasing the lock-up clutch 36 is applied to the first shift control valve 330, the piston 362 is moved against the biasing action of the spring 358 in the direction away from the gain changing spring 360, whereby the spring 360 is in the inoperative position not affecting the spool 350. In this condition, the spool 350 is moved as indicated in solid line in FIG. 15. When the first signal pressure Psol1 is not applied to the valve 330, the piston 362 is moved by the biasing force of the spring 358 toward the gain changing spring 360, whereby the spring 360 is brought into its operative position. The spring 360 is compressed only while the spool 350 is located on one side of the neutral position on the side of the shift-down position. Accordingly, the spool 350 is moved toward the shift-up position by the compressed gain changing spring 360, as indicated in one-dot chain line in FIG. 15, while the spool 350 is located on the side of the shift-down position. In this connection, it is noted that the CVT 14 has a general tendency that the response time increases with a decrease in the peripheral speed of the transmission belt 44 (i.e., the vehicle speed or input shaft speed Nin), and that the shifting time increases with an increase in the actual speed ratio "r". Particularly, the shifting response of the CVT 14 is undesirably low when the speed of the belt 44 is considerably low. To detect a lower limit of the speed of the belt 44 below which the response of the CVT 14 is significantly low, the first shift control valve 330 utilizes the first signal pressure Psol1 for releasing the lock-up clutch 36 while the vehicle speed is lower than a given level, e.g., about 30 km/h. That is, the spool 350 is operated as indicated in the solid line in FIG. 15, while the vehicle speed V (speed of the belt 44) is low with the lock-up clutch 36 in the released position. While the vehicle speed V is high with the lock-up clutch 36 in the engaged position, the spool 350 is operated as indicated in the one-dot chain line in FIG. 15, whereby the shift control gain of the valve 330 is reduced. Thus, a sufficiently high shift control gain is obtained during running of the vehicle at a relatively low speed, while the otherwise excessively high shift control gain is reduced during running of the vehicle at a relatively high speed, so that the first shift control valve 330 permits the CVT 14 to exhibit an excellent shifting response over the entire range of the vehicle speed. In the present example of FIG. 15, the shift control gain during the vehicle running at a relatively high speed is reduced only when the spool 350 is located on the side of the shift-down position, since the shifting response of the CVT 14 is inherently low while the CVT 14 is shifted down with the speed ratio being reduced.

In the drain line 335 of the first shift control valve 330, there is provided a drain inhibit valve 400 which is controlled by a second signal pressure Psol2 produced by a second solenoid-operated valve 410. The drain inhibit valve 400 is provided to prevent an excessively high speed of the engine 10 and an excessively high engine braking effect during an anti-lock braking of the vehicle, and to inhibit the draining of the first hydraulic cylinder 54 when the vehicle is stopped before the speed ratio "r" of the CVT 14 reaches the maximum value. The drain inhibit valve 400 has: a valve spool 402 for connection of the drain line 335 to and from the drain; a spring 404 biasing the spool 402 toward the open position; a chamber 406 adapted to receive the third line pressure P(3 to bias the spool 402 toward the closed position; and a chamber 408 adapted to receive the second signal pressure Psol2 to bias the spool 402 toward the open position. The second solenoid-operated valve 410 is connected to a line between the chamber 408 and the downstream side of a flow restrictor 412 whose upstream side is connected to the third pressure line 221. When the valve 410 is in the on or open position, the second signal pressure Psol2 is not produced, with the downstream side of the flow restrictor 412 released to the drain. When the valve 410 is off or closed, the second signal pressure Psol2 equal to the third line pressure P(3 is applied to the chamber 408 to move the spool 402 to the open position.

Figure 17:
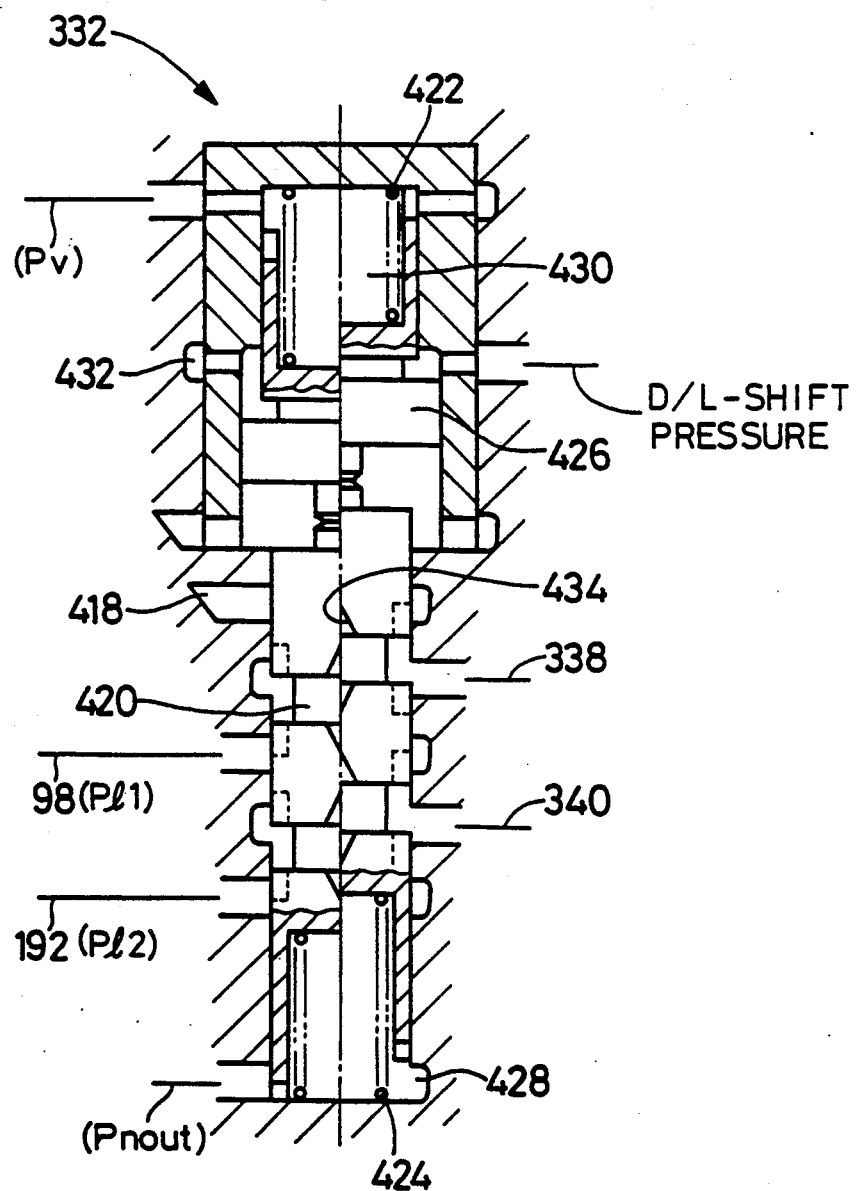

As shown in detail in FIG. 17, the second shift control valve 332 includes a valve spool 420 movable between a shift-down position for connecting the third cylinder line 338 to a drain port 418 and concurrently connecting the fourth cylinder line 340 to the first pressure line 98, and a shift-up position for connecting the third cylinder line 338 to the first pressure line 98 and concurrently connecting the fourth cylinder line 340 to the second pressure line 192. The valve 332 also includes an upper neutral spring 422 biasing the spool 420 toward the shift-up position (downward direction as seen in FIG. 17), a lower neutral spring 424 biasing the spool 420 toward the shift-down position (upward direction as seen in FIG. 17), and a plunger 426 interposed between the upper neutral spring 422 and the spool 420. Adjacent to the end of the spool 420 on the side of the lower neutral spring 424, there is formed a chamber 428 adapted to receive the output shaft speed pressure Pnout. Adjacent to the end of the plunger 426 on the side of the upper neutral spring 422, there is formed a chamber 430 adapted to receive the vehicle speed pressure Pv. Between a large-diameter portion (on the side of the spool 420) and a small-diameter portion (on the side of the upper neutral spring 422) of the plunger 426, there is formed a chamber 432 adapted to receive the D/L-shift pressure. Each land of the spool 420 has a V-shaped notch 434 for gradually changing the area of fluid flow through the valve 332 as the spool 420 is moved.

When the reversing device 16 is in the neutral position (in which no power is transmitted) with the shift lever 252 placed in the NEUTRAL position "N" as in a coasting or inertial running of the vehicle, the spool 420 of the second shift control valve 332 is positioned under equilibrium of forces between the thrust based on the vehicle speed pressure Pv biasing the spool 420 toward the shift-up position, and the thrust based on the output shaft speed pressure Pnout biasing the spool 420 toward the shift-down position, so that the speed ratio "r" of the CVT 14 is controlled so as to zero a difference between the input shaft 38 of the reversing device 16 (output shaft of the CVT 14) and the output shaft 58. When the shift lever 252 is placed in the DRIVE or LOW position "D", "L", the D/L-shift pressure is applied to the chamber 432 to hold the plunger 426 and the spool 420 in the shift-up position, irrespective of the vehicle speed pressure Pv and the output shaft speed pressure Pnout. This arrangement eliminates unnecessary movements of the spool 420 and resulting wear of the valve 332 and inclusion of metal particles in the working fluid due to the wear, and avoids sticking of the spool 420 in its shift-down position, which may cause racing of the engine 10 upon operating of the shift lever 252 to the DRIVE or LOW position "D", "L" with the spool 420 in the shift-down position.

The second hydraulic cylinder 56 is connected to the second pressure line 192 through a by-pass line 440 which has a one-way valve 436 and a flow restrictor 438 connected in parallel with the valve 436. The one-way valve 436 permits a flow of the fluid in the direction from the second pressure line 192 toward the second hydraulic cylinder 56, but inhibits a flow of the fluid in the opposite direction.

Referring back to FIG. 1, the engine 10 is provided with an engine speed sensor 444 for detecting the speed Ne of the engine, and a throttle sensor 446 for detecting the throttle valve opening $\theta$th. The output signals of these sensors 444, 446 are fed to an electronic control device 450. The differential gear device 20 is provided with a vehicle speed sensor 448 for detecting the vehicle speed V. The output of the sensor 448 is also fed to the electronic control device 450. This control device 450 is constituted by a so-called microcomputer incorporating a CPU (central processing unit) 452, a ROM (read-only memory) 454, a RAM (random-access memory) 456, and an interface circuit. The CPU 452 processes the input signals to produce output signals for controlling the first and second solenoid-operated valves 308, 410, according to control programs stored in the ROM 454 while utilizing a temporary data storage function of the RAM 456.

For example, the CPU 452 operates to perform a lock-up clutch control routine for determining the engagement or disengagement of the lock-up clutch 36, according to a control program stored in the ROM 454, based on the vehicle speed V and the throttle valve opening $\theta$th. When the CPU 452 determines that the lock-up clutch 36 should be engaged, the CPU 452 produces a signal for energizing the first solenoid-operated valve 308. When the CPU 452 determines that the lock-up clutch 36 should be released, the CPU 452 produces a signal for deenergizing the valve 308. The CPU 452 is also adapted to perform a routine for preventing a rapid shift-down operation of the CVT 14. In this routine, the CPU 452 determines whether the actually detected engine speed Ne exceeds a predetermined upper limit stored in the ROM 454. When this determination is affirmative, the CPU 452 produces a signal for energizing the second solenoid-operated valve 410 to close the drain line 335, and thereby preventing an excessive rise of the engine speed Ne. The CPU 452 also operates to determine whether the speed ratio "r" of the CVT 14 has reached the maximum value "rmax" when the drive wheels 24 are stopped, i.e., when the vehicle speed V becomes zero. If this determination is negative, the CPU 452 produces a signal for energizing the second solenoid-operated valve 410 to close the drain line 335, thereby preventing the first hydraulic cylinder 54 from being drained through the switching valve 328, first shift control valve 330 and drain line 335, when the vehicle is abruptly or suddenly stopped. Where the vehicle is equipped with an anti-lock brake system, the CPU 452 operates to prevent an excessive engine braking effect to the vehicle during braking of the vehicle in an anti-lock mode, which requires a relatively long time for the drive wheels 24 to rise again. To this end, the CPU 452 determines whether the vehicle is in the anti-lock braking mode or not. If this determination is affirmative, the CPU 452 produces a signal for energizing the second solenoid-operated valve 410 to inhibit a further shift-down operation of the CVT 14.

In the present embodiment of the hydraulic control apparatus, the first shift control valve 330 has the spool valve 350 adapted to receive the second throttle pressure Pth2, vehicle speed pressure Pvlim and input shaft speed pressure Pnin, so that the speed ratio "r" is increased to shift down the CVT 14, in relation to an increase in the second throttle pressure Pth2 and an increase in the vehicle speed pressure Pvlim, and so that the speed ratio "r" is decreased to shift up the CVT 14, in relation to an increase in the input shaft speed pressure Pnin. Further, the limit valve 388 connected between the flow restrictor 386 and the first shift control valve 330 limits the vehicle speed pressure Pvlim to a level corresponding to the second throttle pressure Pth2, after the pressure Pvlim initially increases to that level with the vehicle speed V. Namely, the pressure Pvlim is held constant after the vehicle speed V exceeds a given level corresponding to the second throttle pressure Pth2. Accordingly, the speed ratio "r" of the CVT 14 is controlled such that the input shaft speed Nin for a given throttle opening angle $\theta$th increases with the vehicle speed pressure Pvlim and the vehicle speed V, while the vehicle speed V is lower than the level corresponding to the second throttle pressure Pth2 (while the speed ratio "r" is relatively near the maximum value "rmax"), and such that a further increase in the input shaft speed Nin with the vehicle speed V is inhibited with the vehicle speed pressure Pvlim limited to the level corresponding to the second throttle pressure Pth2. Thus, the input shaft speed Nin increases with the vehicle speed V while the speed ratio "r" is relatively near the maximum value "rmax", but is kept constant irrespective of a further increase in the vehicle speed V, after the speed ratio "r" becomes smaller than a given point corresponding to the second throttle pressure Pth2. Consequently, the present arrangement assures not only excellent drivability or acceleration of the vehicle, but also reduction in the engine operating noise during running of the vehicle at a relatively low speed. The same arrangement further assures high fuel economy of the vehicle due to the constant input shaft speed Nin during running of the vehicle at a relatively high speed.

There will be described another embodiment of the present invention. The same reference numerals as used in the preceding embodiment will be used to identify the corresponding elements of the second embodiment. No redundant description of these elements will not be provided.

Figure 18:
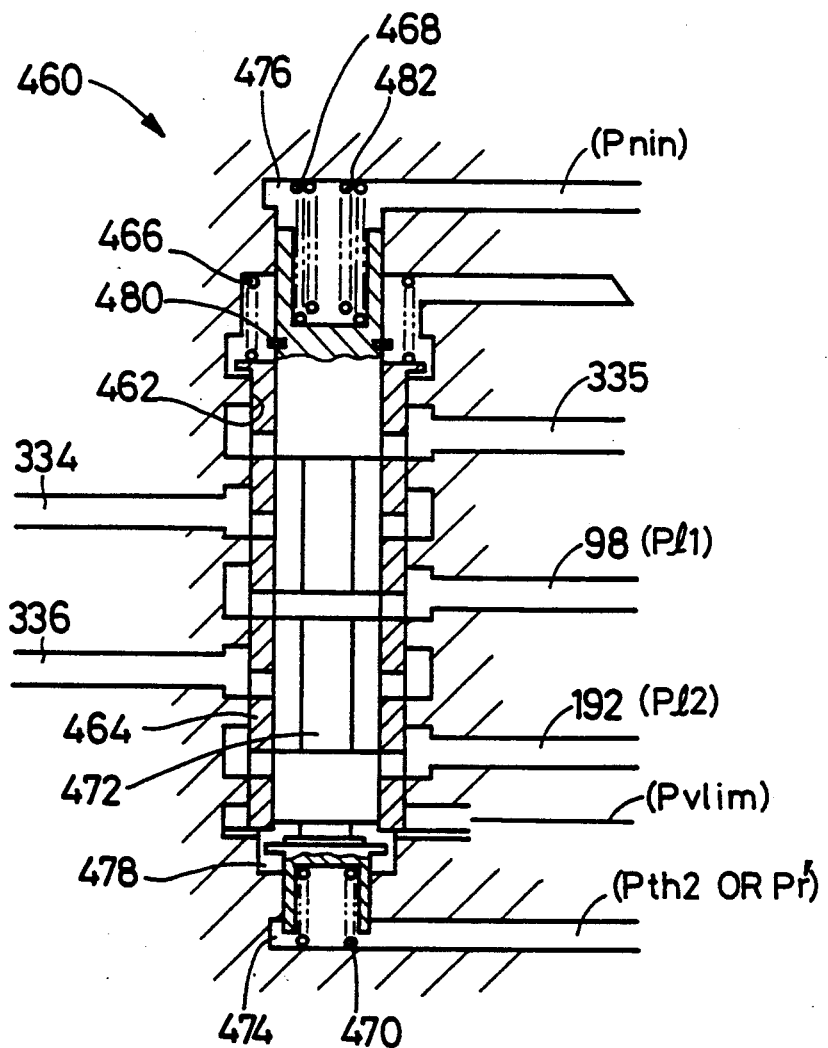
FIG. 18 is a cross sectional view of a modified first shift control valve used in another embodiment of the invention.

In this second embodiment, a first shift control valve 460 as shown in FIG. 18 is used in place of the valve 330 used in the preceding embodiment. The valve 460 includes: a movable sleeve 464 slidably received in a cylinder bore 462; a spring 466 biasing the movable sleeve 464 in one axial direction (in the downward direction as seen in FIG. 18); an upper neutral spring 468; a lower neutral spring 470; and a valve spool 472 slidably received in the movable sleeve 464 and interposed between the upper and lower neutral springs 468, 470. The first shift control valve 460 has: a chamber 474 adapted to receive the higher one of the second throttle pressure Pth2 and the modified speed-ratio pressure Pr', to bias the spool 472 toward the shift-down position; a chamber 476 adapted to receive the input shaft speed pressure Pnin to bias the spool 472 toward the shift-up position; and a chamber 478 adapted to receive the vehicle speed pressure Pvlim to bias the spool 472 toward the shift-down position and bias the movable sleeve 464 against the biasing force of the spring 466. The valve 460 also includes a stop 480 for limiting a distance of movement of the movable sleeve 464 relative to the spool 472, and a gain changing spring 482 accommodated in the chamber 476 to bias the spool 472 to change the shift control gain of the spool when the spool 472 has moved toward the shift-down position by more than a predetermined distance.

Figure 19:
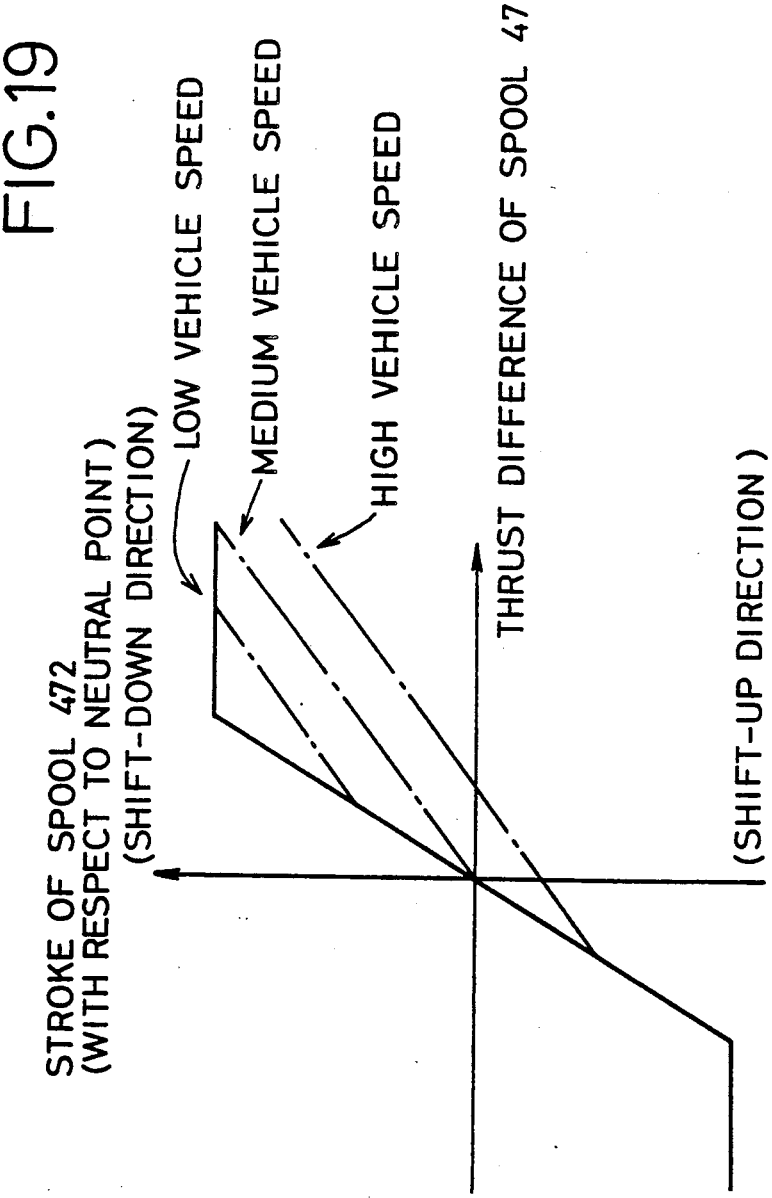
FIG. 19 is a graph indicating the operating characteristic of the, first shift control valve of FIG. 18.

The present first shift control valve 460 operates similarly to the valve 330 of FIG. 16. Namely, the valve spool 472 is operated in principle as indicated in solid line in FIG. 19. However, as the movable sleeve 464 is moved against the biasing force of the spring 466, with an increase in the vehicle speed pressure Pvlim, the neutral position of the spool 472 is shifted in the shift-down direction, so that a distance of movement of the spool 472 necessary for abutting contact with the gain changing spring 482 decreases with an increase in the vehicle speed V. Accordingly, when the vehicle speed is relatively low, the shift control gain is reduced by the gain changing spring 482 only after the spool 472 is moved in the shift-down direction by a considerably large distance, as indicated in the uppermost one-dot chain line in FIG. 19. When the vehicle speed is medium, the shift control gain is reduced by the spring 482 after the spool 472 reaches the neutral position during its movement toward the shift-down position, namely, over the entire range of the shift-down stroke, as indicated in the middle one-dot chain line in FIG. 19. When the vehicle speed is relatively high, the spring 482 reduces the shift control gain even over a certain portion of the shift-up stroke of the spool 472 near the neutral position, as well as over the entire range of the shift-down stroke. In the present embodiment, the vehicle speed pressure Pvlim serves as a control pressure for changing the gain of the first shift control valve 460.

Figure 20:
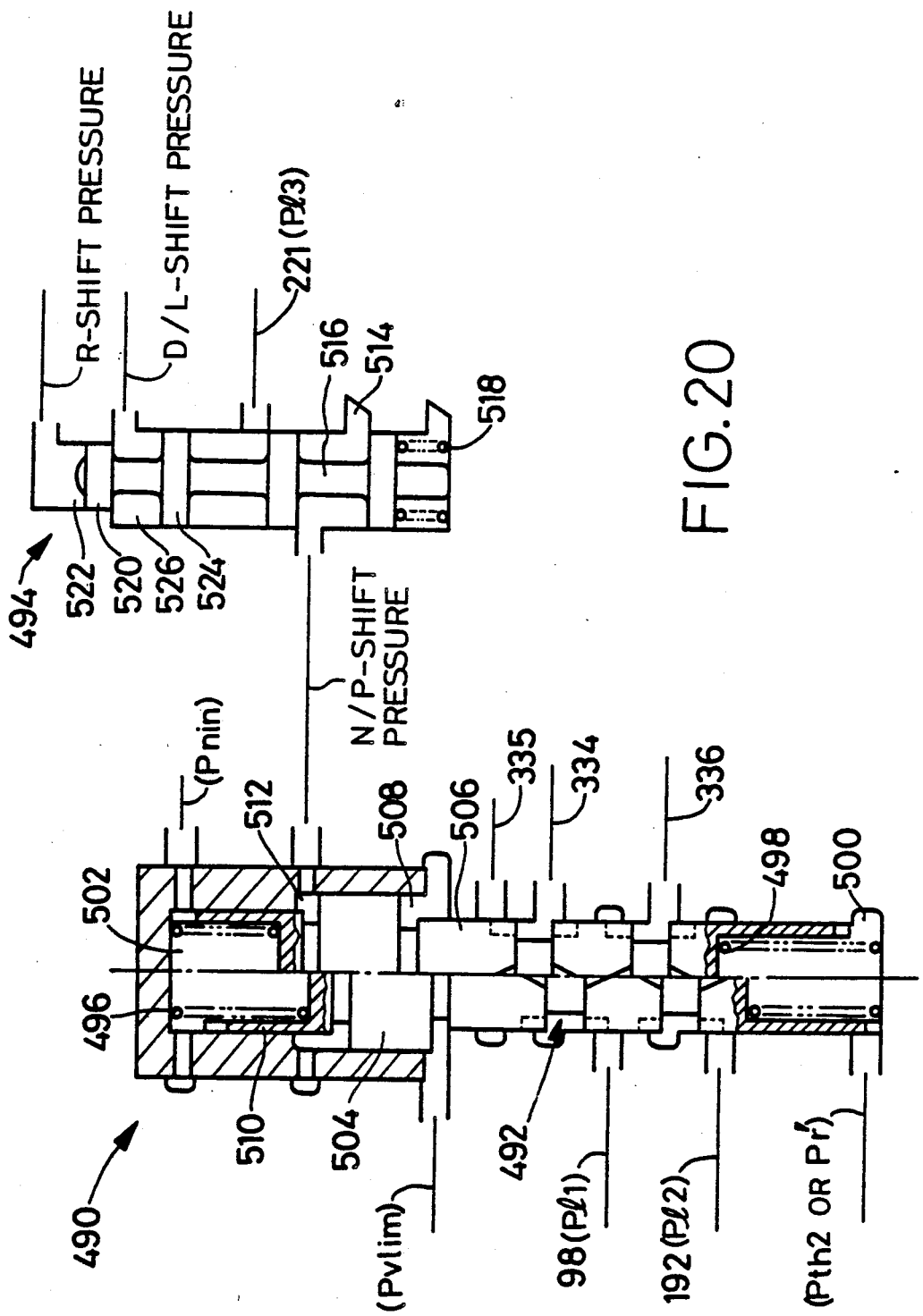
FIG. 20 is a cross sectional view showing a further embodiment of the invention including a modified first shift control valve.

Another modified first shift control valve 490 alternative to the valve 330 of FIG. 16 is shown in FIG. 20. This first shift control valve 490 has a function of inhibiting movements of a valve spool 492 under a certain condition, and is operated in combination with a signal relay valve 494. The valve spool 492 has a shift-down position for connecting the first cylinder line 334 to the drain line 335 and concurrently connecting the second cylinder line 336 to the first pressure line 98, and a shift-up position for connecting the first cylinder line 334 to the first pressure line 98 and concurrently connecting the second cylinder line 336 to the second pressure line 192. The valve 490 also has: an upper neutral spring 496 biasing the spool 492 toward the shift-up position (in the downward direction as seen in FIG. 20); a lower neutral spring 498 biasing the spool 492 toward the shift-down position; a chamber 500 which is formed adjacent to the end of the spool 492 on the side of the lower neutral spring 498 and is adapted to receive the higher one of the second throttle pressure Pth2 and the modified speed-ratio pressure Pr'; a chamber 502 which is formed adjacent to the other end of the spool 492 on the side of the upper neutral spring 496 and is adapted to receive the input shaft speed pressure Pnin; a chamber 508 adapted to receive the vehicle speed pressure Pvlim; and a chamber 512 adapted to receive the N/P-shift pressure. The chamber 508 is formed between a large-diameter portion 504 of the spool 492 and a spool portion 506 of the spool 492 which has a smaller diameter than the large-diameter portion 504. The chamber 512 is formed between the large-diameter portion 504, and a small-diameter end portion 510 which is formed at the end of the spool 492 on the side of the upper neutral spring 496 and which has a smaller diameter than the large-diameter portion 504.

In the present embodiment, the manual valve 250 is not adapted to produce the N/P-shift pressure indicating that the shift lever 252 is placed in the NEUTRAL or PARKING position "N", "P". Instead, the signal relay valve 494 is provided to produce the N/P-shift pressure from the R-shift pressure and the D/L-shift pressure. The signal relay valve 494 has: a valve spool 516 having a position for connection of the chamber 512 of the valve 490 to the third pressure line 221, and a position for connection of the chamber 512 to a drain port 514; a spring 518 biasing the spool 516 toward the open position; a chamber 522 which is formed adjacent to an end of a first land 520 of the spool 516 having a relatively small diameter and which is adapted to receive the R-shift pressure; and a chamber 526 which is formed between the first land 520 and a second land 524 of the spool 516 and which is adapted to receive the D/L-shift pressure. When at least one of the R-shift and D/L-shift pressures is applied to the signal relay valve 494, the spool 516 is located in a position of FIG. 20 in which the chamber 512 of the valve 490 is in communication with the atmosphere, whereby the valve 490 is allowed to operate. When neither the R-shift pressure nor the D/L-shift pressure is applied to the valve 494, the third line pressure Pl3 is applied as the N/P-shift pressure to the valve 494, whereby the spool 492 of the first shift control valve 490 is held in the shift-up position, to inhibit the shift control operation of the valve 490.

In the embodiment of FIG. 20, not only the second shift control valve 332 but also the first shift control valve 490 are prevented from unnecessarily operating, to protect the valves against early wearing due to unnecessary sliding movements of the spool, and thereby improve the operating reliability of the valves.

While the present invention has been described in its presently preferred embodiments, it is to be understood that the invention may be otherwise embodied.

In the illustrated embodiments, the vehicle-speed sensing pump 86 is used to produce the vehicle speed pressure Pv indicative of the vehicle speed. However, a well known governor valve may be used to produce a vehicle speed pressure Pv indicative of the speed of the output shaft 38 of the CVT 14.

In the illustrated embodiments, the first and second throttle pressures Pth1 and Pth2 are produced by the respective first and second throttle sensing valves 102, 114 having the respective cams 104, 116 which are rotated as the throttle valve is operated. However, the cams 104, 116 may be operatively linked with an accelerator pedal so that the cams are rotated as the pedal is depressed. Further, the throttle pressures Pth1, Pth2 may be replaced by any hydraulic signals indicative of a parameter or parameters reflecting the output of the engine 10 which is currently required or desired by the vehicle operator.

While the switching valve 328 is provided to enable one of the first and second shift control valves 330, 332, the valve 328 may be replaced by a valve having chambers and a piston which are adapted to lock the spool 420 of the second shift control valve 332 in the neutral position to inhibit its operation based on the D/L-shift pressure while permitting the first shift control valve 330 to operate, and lock the spool 350 of the first shift control valve 330 in the neutral position to inhibit its operation based on the N-shift pressure while permitting the second shift control valve 332 to operate.

In the embodiments of FIGS. 16 and 18, the gain of the first shift control valve 330, 460 is reduced based on the first signal pressure Psol1 or vehicle speed pressure Pvlim when the vehicle speed is relatively high. However, the first signal pressure Psol1 or vehicle speed pressure Pvlim may be replaced by the input shaft speed pressure Pnin, which may be used to change the gain of the valve 330, 460 since the pressure Pnin varies with vehicle speed V while the throttle valve opening θth is relatively small.

Although the illustrated embodiments are adapted such that the vehicle speed pressure Pvlim is limited to a predetermined upper limit which increases with an increase in the throttle valve opening θth, it is possible that a rate of increase in the vehicle speed pressure is limited after the vehicle speed pressure rises to a predetermined upper limit which increases with an increase in the throttle valve opening or the engine output currently required by the vehicle operator.

It is to be understood that the present invention may be embodied with various other changes, modifications and improvements, which may occur to those skilled in the art, without departing from the spirit and scope of the invention defined in the following claims.

What is claimed is:

1. A hydraulic control apparatus for controlling a speed ratio of a continuously variable transmission for a motor vehicle with an engine, the transmission having an input and an output shaft and a hydraulic actuator, said apparatus comprising:

means for producing a first pressure varying with a speed of said input shaft;

means for producing a second pressure varying with a concurrently required output of said engine;

means for producing a third pressure varying with a running speed of said vehicle, such that a rate of increase in said third pressure is limited after said third pressure reaches a predetermined upper limit which varies with said second pressure; and a shift control valve device including a valve spool which receives said first pressure, said second pressure and said third pressure to control said speed ratio, said shift control valve device operating to control said hydraulic actuator for changing said speed ratio so as to shift down said transmission, in relation to an increase in said currently required output of the engine and an increase in said running speed of the vehicle, and changing said speed ratio so as to shift up said transmission in relation to an increase in said input shaft speed.

2. A hydraulic control apparatus according to claim 1, wherein said continuously variable transmission consists of a belt-and-pulley type continuously variable transmission including a first and a second variable-diameter pulley, a first and a second hydraulic cylinder as said hydraulic actuator for changing effective diameters of said first and second pulleys, respectively, and a transmission belt connecting said first and second pulleys.

3. A hydraulic control apparatus according to claim 1, further comprising a first pressure regulating valve for producing a first line pressure which increases with a throttle pressure indicative of an amount of opening of a throttle valve of the engine and with a second line pressure, a second pressure regulating valve for producing said second line pressure which increases with said throttle pressure, and a pair of lines which are connected to said shift control valve device and said first and second hydraulic cylinders, for applying said first and second line pressures to said first and second hydraulic cylinders, respectively, for controlling said speed ratio of said transmission.

4. A hydraulic control apparatus according to claim 1, wherein said shift control valve device has a chamber adapted to receive said first pressure to bias said valve spool, a chamber adapted to receive said third pressure to bias said valve spool, a chamber adapted to receive said second pressure to bias said valve spool, and a pair of neutral springs biasing said valve spool in a shift-up and a shift-down direction for shifting up and down said valve spool, respectively.

5. A hydraulic control apparatus according to claim 2, wherein said means for producing said first pressure has an annular groove formed in said first pulley such that said groove is open in a radially inward direction of said first pulley, and a pitot tube one end of which is located in said annular groove.

6. A hydraulic control apparatus according to claim 1, wherein said means for producing said third pressure comprises a pump which is driven with rotation of a drive wheel of the vehicle.

7. A hydraulic control apparatus according to claim 1, wherein said means for producing said second pressure comprises a cam which is rotated with a throttle valve of the engine and which has a cam surface, a plunger which engages said cam surface and which is axially moved by a distance corresponding to an angle of rotation of said cam, and a valve spool which is positioned under equilibrium of forces between a thrust acting on said spool via a spring in one of opposite axial directions of the spool, and a sum of a thrust based on said second pressure acting on said spool as a feedback pressure in the other axial direction and a thrust based on another spring which acts on said spool in said other axial direction.

8. A hydraulic control apparatus according to claim 1, further comprising means for reducing an amount of change in said second pressure produced by said means for producing an engine output pressure.

9. A hydraulic control apparatus according to claim 8, wherein said means for reducing an amount of change in said second pressure comprises an accumulator connected to an output port of said means for producing said second pressure, and a flow restrictor disposed between said output port and said accumulator, so that said second pressure is obtained between said flow restrictor and said accumulator.

10. A hydraulic control apparatus according to claim 1, wherein said means for producing said third pressure comprises means for limiting said third pressure to said predetermined upper limit which increases with an increase in said second pressure.

11. A hydraulic control apparatus according to claim 10, wherein said means for producing said third pressure further comprises a pump for producing a pressure indicative of said running speed of the vehicle, and said means for limiting said third pressure to said predetermined upper limit comprises a flow restrictor disposed between said pump and said shift control valve device, and a limit valve connected to said pump through said restrictor and operating to release said pressure produced by said pump to a drain when said pressure produced by said pump reaches said predetermined upper limit.

12. A hydraulic control apparatus according to claim 1, further comprises means for producing a modified speed-ratio pressure which varies with said speed ratio of the transmission when said speed ratio is higher than a predetermined value, and which is held constant when said speed ratio is lower than said predetermined value, and pressure selecting means for applying to said shift control valve device a higher one of said second pressure and said modified speed-ratio pressure.

13. A hydraulic control apparatus according to claim 12, wherein said means for producing a modified speed-ratio pressure comprises a pressure reducing valve including a valve spool which receives said modified speed-ratio pressure as a feedback pressure acting thereon toward a closed position thereof, a spring for biasing said spool of the pressure reducing valve toward an open position of the spool, and a plunger disposed such that said spring is interposed between said plunger and said spool of said pressure reducing valve, said plunger being movable toward said valve spool of said pressure reducing valve, to increase a biasing force of said spring with an increase in said modified speed-ratio pressure, until said plunger is brought into abutting contact with a body of said pressure reducing valve.

* * * * *